(12) United States Patent
Lee et al.

(10) Patent No.: US 11,677,537 B2
(45) Date of Patent: Jun. 13, 2023

(54) SIGNAL DELAY CONTROL AND RELATED APPARATUSES, SYSTEMS, AND METHODS

(71) Applicant: Micron Technology, Inc., Boise, ID (US)

(72) Inventors: Hyunui Lee, Kanagawa (JP); Won Joo Yun, Boise, ID (US); Baekkyu Choi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 17/204,681

(22) Filed: Mar. 17, 2021

(65) Prior Publication Data

US 2022/0303111 A1 Sep. 22, 2022

(51) Int. Cl.
*H04L 7/00* (2006.01)
*H04L 25/00* (2006.01)
*H04L 25/40* (2006.01)
*H04L 7/02* (2006.01)

(52) U.S. Cl.
CPC .................................... *H04L 7/02* (2013.01)

(58) Field of Classification Search
CPC ............ H04L 7/02; H04L 7/0016; G06F 1/10
USPC ................. 375/371, 373, 257, 258, 224, 226
See application file for complete search history.

(56) References Cited

U.S. PATENT DOCUMENTS

| 7,719,482 | B2 * | 5/2010 | Unger | ................ | H04N 21/4122 345/538 |
| 2012/0294401 | A1 * | 11/2012 | Lin | ........................... | G06F 1/10 375/362 |
| 2015/0229467 | A1 * | 8/2015 | Lee | ........................ | H04L 7/0016 375/371 |
| 2016/0080106 | A1 * | 3/2016 | Srinivasan | ............ | H04W 64/00 455/1 |

* cited by examiner

*Primary Examiner* — Phuong Phu
(74) *Attorney, Agent, or Firm* — TraskBritt

(57) ABSTRACT

The present application is directed to signal delay control and related apparatuses, systems, and methods. An apparatus includes delay elements and control circuitry electrically connected to the delay elements. The delay elements are configured to receive skewed data signals and delay codes indicating delay quantities. The delay elements are also configured to provide delayed data signals delayed relative to the skewed data signals by the delay quantities. The control circuitry is configured to provide the delay codes, which are selected to reduce a timing skew of the delayed data signals relative to a timing skew of the skewed data signals. A system includes a first device, a second device including the apparatus, and transmission lines electrically connected between the first device and the second device. A method includes calibrating the delay codes.

19 Claims, 17 Drawing Sheets

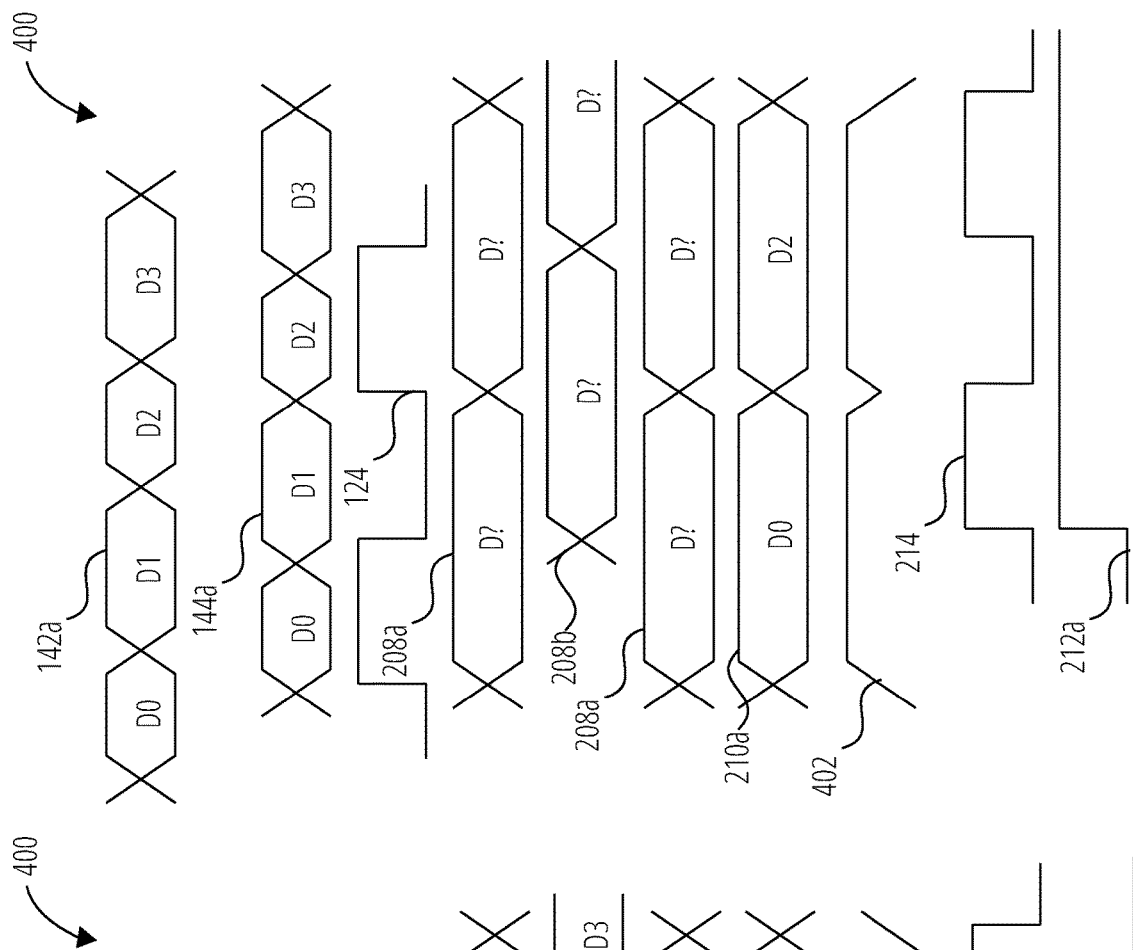
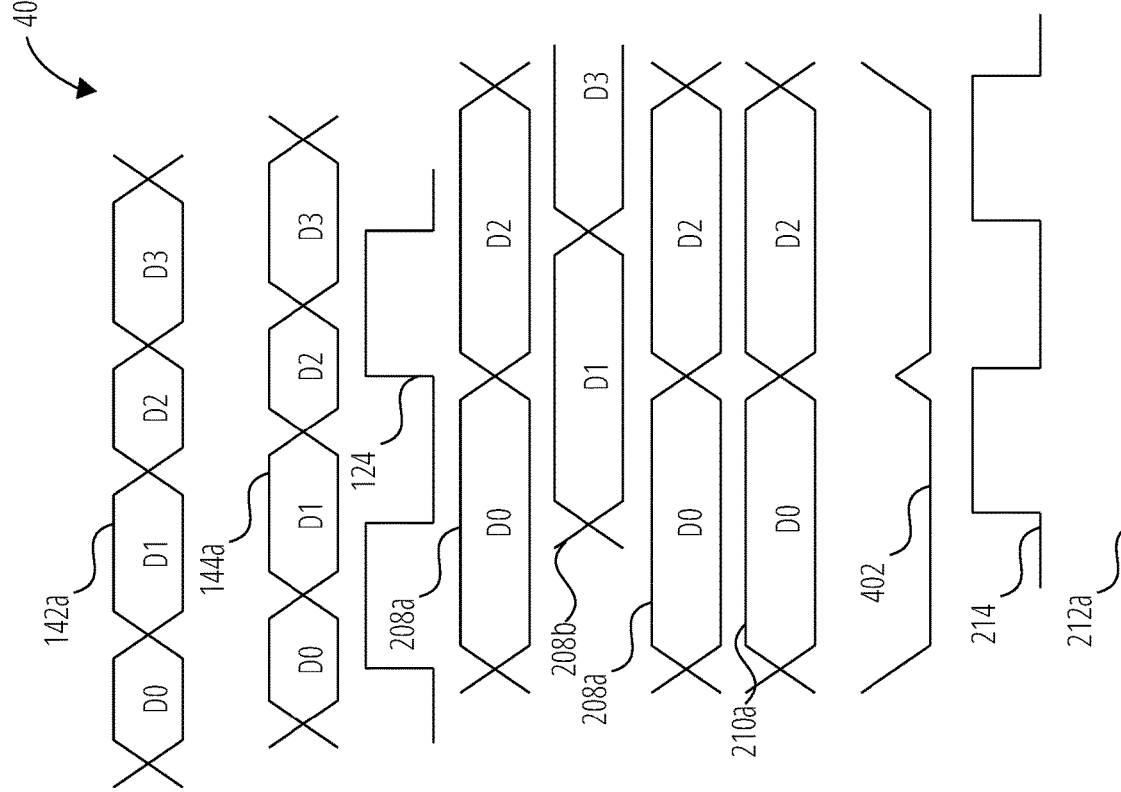
FIG. 4D
FIG. 4C

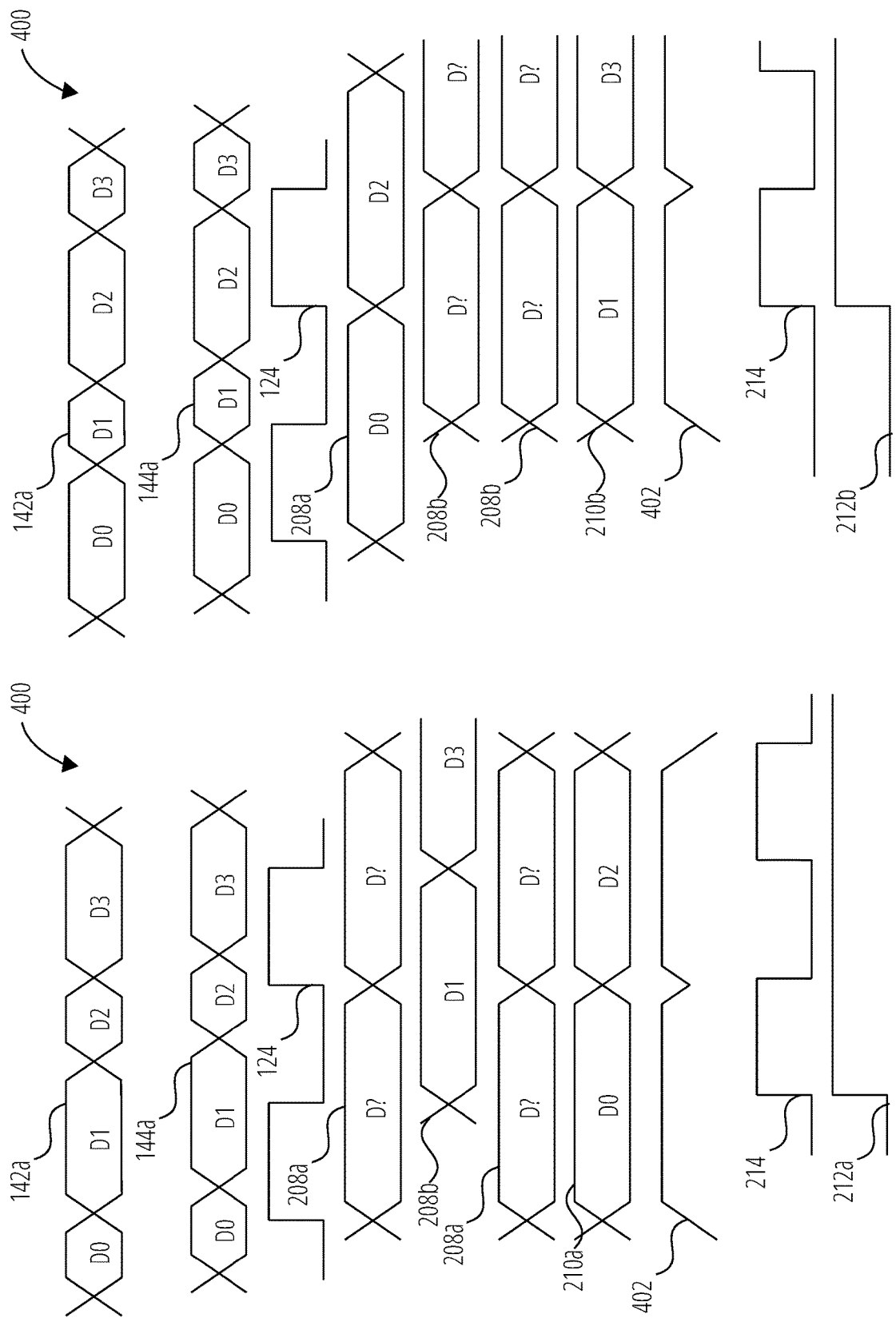

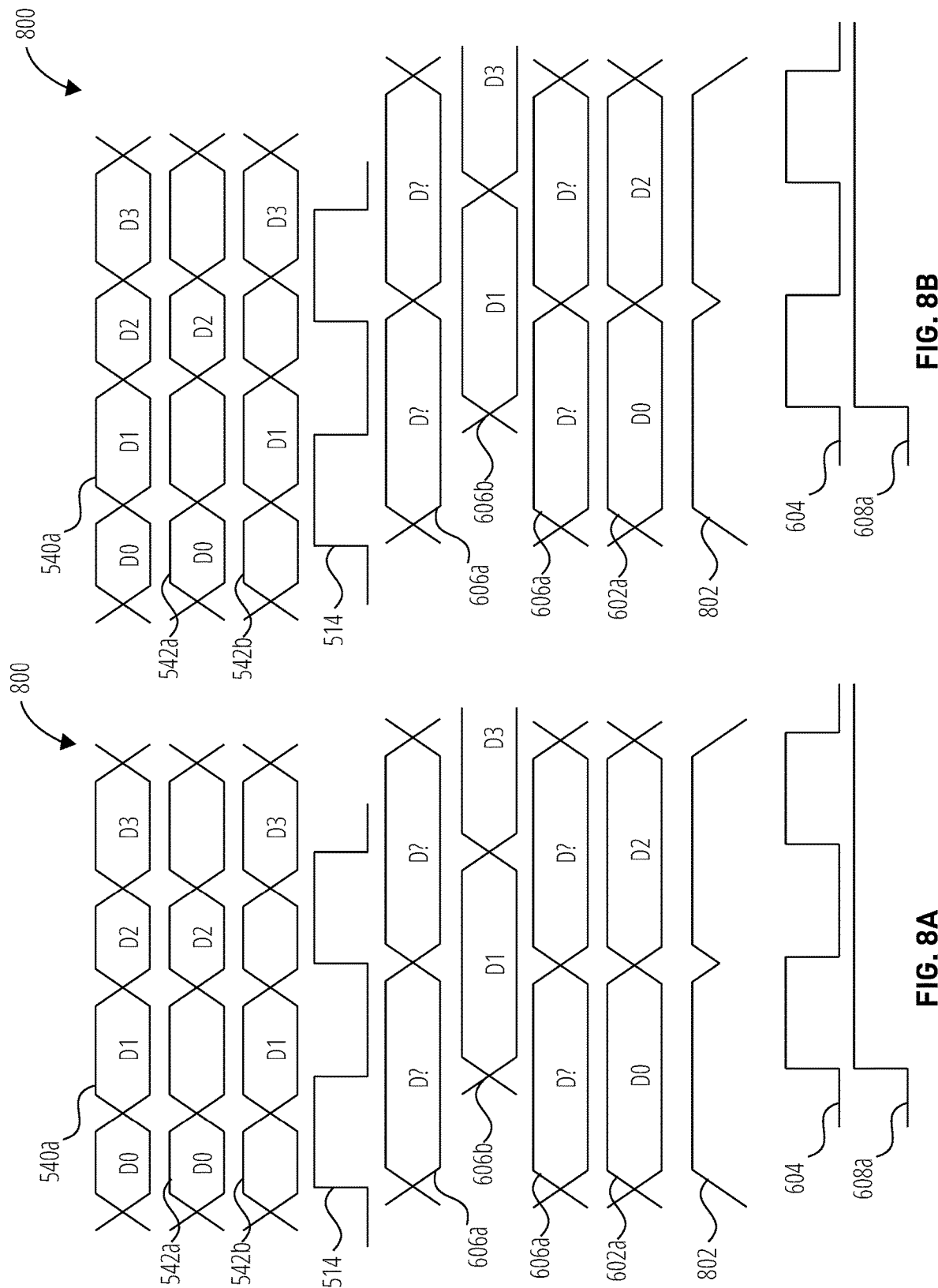

SIGNAL DELAY CONTROL AND RELATED APPARATUSES, SYSTEMS, AND METHODS

TECHNICAL FIELD

This disclosure relates generally to control of delay of data signals, and more specifically to control of delay and/or duty of data signals for memory read and/or write operations.

BACKGROUND

Electrical transmission lines may be used to electrically connect devices together. As some examples, conductive traces on printed circuit boards (PCBs), device pins, conductive structures within devices themselves (e.g., conductive materials in and/or on semiconductor devices), wires, and other conductive structures may serve as transmission lines to conduct signals between devices. Different transmission lines may delay signals conducted thereby by different amounts of time (e.g., depending on physical and/or electrical dimensions of the transmission lines).

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

FIG. 4C is a signal timing diagram of the signals of the portion of FIG. 2 responsive to a midterm delay quantity provided from the control circuitry to the delay element in the delay code;

FIG. 4D is a signal timing diagram of the signals of the portion of FIG. 2 responsive to a maximum delay quantity provided from the control circuitry to the delay element in the delay code;

FIG. 4E is a timing diagram of the signals of the portion of FIG. 2 responsive to a minimum duty quantity provided from the control circuitry; to an input buffer; in a duty code;

FIG. 4F is a timing diagram of the signals of the portion of FIG. 2 responsive to a maximum duty quantity provided from the control circuitry to the input buffer in the duty code;

FIG. 8A is a signal timing diagram of signals of the portion of FIG. 6 illustrating a failure in sampling one of the delayed data signals;

FIG. 8B is a signal timing diagram of the signals of the portion of FIG. 6 responsive to a minimum delay quantity provided from control circuitry to delay elements in the delay codes;

DETAILED DESCRIPTION

Figure 1:
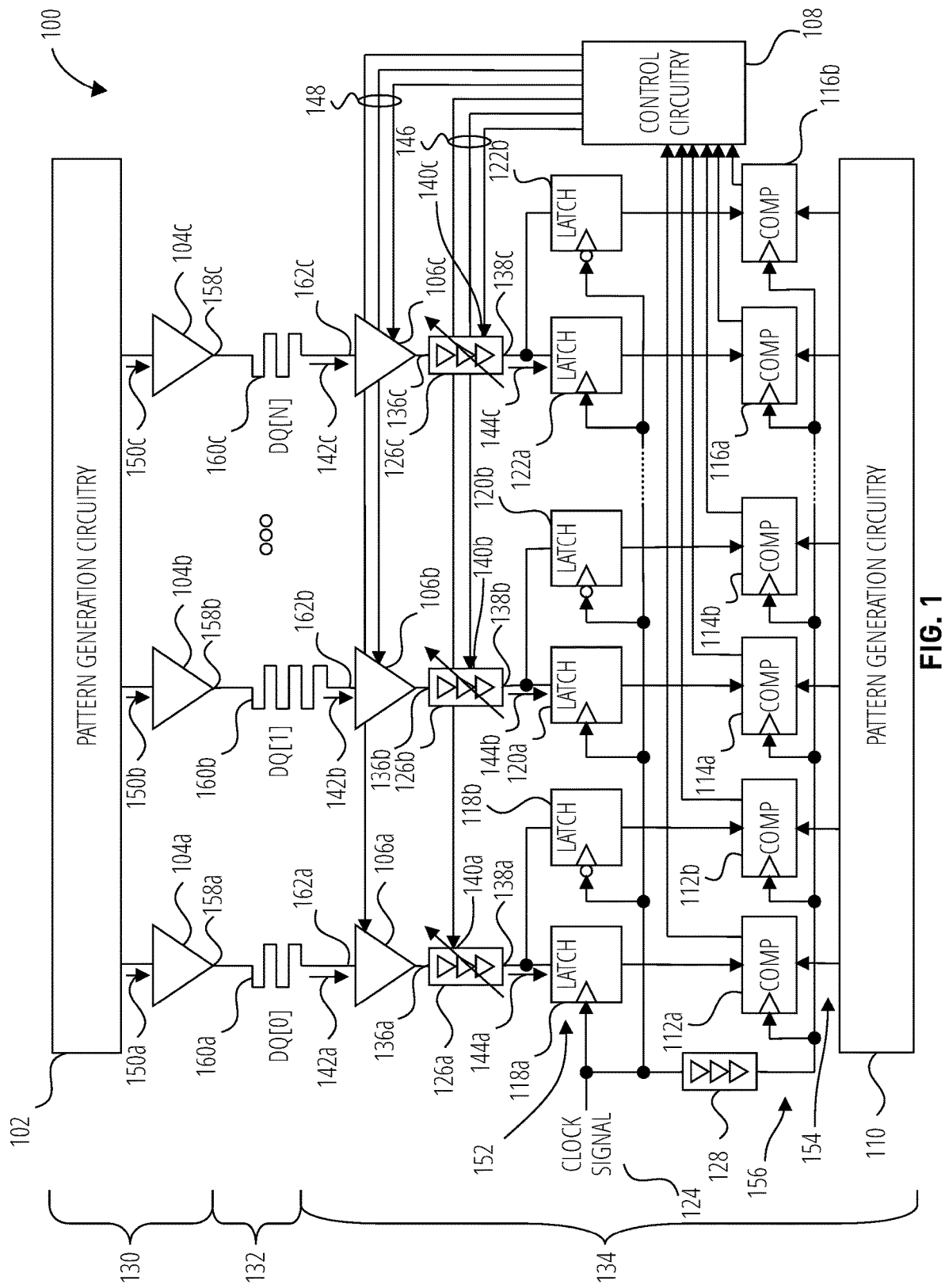
FIG. 1 is a block diagram of an electrical system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "electrically connected" refers to both direct electrical connection (i.e., no intervening objects electrically connected between) and indirect electrical connection (i.e., one or more intervening objects electrically connected between).

As used herein, the terms "skew" and "skewed timing," when used with reference to signals, refer to misalignment, in time, between transition points of the signals. For example, digital signals may convey information using different logic level voltage potentials (e.g., a logic level high voltage potential or "1" and a logic level low voltage potential or "0"). Although transitions, or rising and falling edges, between the different logic level voltage potentials may be substantially synchronized in time when provided by a first device, these transitions may fall out of synchronization, or be skewed, when delivered to a second device. Such skew between transition points (e.g., rising and falling edges) of signals may result from different transmission delays associated with different transmission lines carrying the signals from the first device to the second device. Skew may also arise from other factors such as device packaging.

A computing system may include a computing host device (e.g., a processor such as a central processing unit) electrically connected to a memory device (e.g., a dynamic random access memory (DRAM) device). The host device may be electrically connected to the memory device via traces of a printed circuit board (PCB) such as a motherboard or logic board. Data input/output signals DQ transmitted between the computing host device and the memory device may be skewed due to different transmission delays associated with the different transmission lines (e.g., traces) used to conduct the data input/output signals DQ, which may account for up to substantially 110-120 picoseconds (ps) of skew between signals. Also, additional skew may be introduced due to module and/or packaging effects, which may account for up to substantially 30-40 ps of skew. As a result, by the time data input/output signals DQ are received, up to substantially 150 ps of skew may be present, which may be substantially half a unit interval of time assuming 3200 megahertz (MHz) operation. Such skew may result in sampling of the DQ signals relatively close to transition points between bits, which may result in errors in the sampled data bits. Furthermore, duty distortion may arise in DQ signals, which may contribute to even further errors in the sampled data bits.

One way to compensate for this skew is to match lengths of transmission lines (e.g., electronic traces on the motherboard, conductive lines in the devices, conductive lines such as pins and wires in device packaging, etc.) that carry DQ signals from the same byte of information, which may reduce discrepancies in transmission delays. Doing so, however, may result in unnecessary meandering of transmission lines to match transmission line lengths, which may consume a non-negligible amount of board and/or chip space. Also, crosstalk between transmission lines of similar lengths may be relatively high.

Errors due to skew and duty distortion may be reduced by using a write timing training sequence to align DQ signals to a clock used to sample the DQ signals. Such training sequences, however, may be relatively time consuming, and may only be performed during execution of basic input/output system (BIOS) code at system startup. As a result, such a write timing training sequence may not be available to compensate for voltage and/or temperature drift after execution of BIOS code. Also, read timing training sequences may not be available to reduce skew in DQ signals during read operations.

Embodiments disclosed herein compensate for skew and duty distortion using electrically controllable delay elements, electrically controllable duty elements (e.g., input buffers), or both, without the need to physically match transmission lines (e.g., PCB traces, device conductors, package wiring and pins, etc.). In addition to the use of a training sequence during execution of BIOS code, timing skew may be compensated for and input duty error correction may be performed. As a result, voltage and/or temperature drift may be compensated for by calibrating delay and/or duty at any time during operation. In addition, per DQ signal training may be achieved.

Embodiments disclosed herein implement per pin timing control, which may be implemented in a memory device. By use of embodiments proposed herein, read and write signal integrity may be improved by elimination of channel skew in each pin. Since the timing control may be performed in the memory device, skew from various components (mother board, module, and package) can be removed. Embodiments disclosed herein may also improve system design efficiency because significant time may otherwise be wasted in matching transmission line lengths.

Embodiments disclosed herein may improve signal integrity quality in system channels. Skewed signals transmitted by unmatched transmission lines with free routing may reduce rank margin tool (RMT) margins for receive and/or transmit signals and reduce development costs. For DRAM memory devices, if skewed inputs at each DQ line can be de-skewed at the front-end of the DRAM device, the margin may be maximized. Embodiments disclosed herein implement a simple method for training/calibrating delay and/or duty at any time during operation. Voltage and temperature drift may also be compensated for during operation. For write (RMT-Tx) margin, DRAM memory devices according to embodiments disclosed herein may implement de-skewing and duty correction logic per bit. For read (RMT-Rx) margin, embodiments disclosed herein may reuse delay codes with weight to intentionally implement slight skew in DQ lines to reduce crosstalk.

In some embodiments an apparatus includes delay elements and control circuitry. The delay elements include data input terminals, delay adjustment terminals, and data output terminals. The data input terminals are configured to receive skewed data signals. The delay adjustment terminals are configured to receive delay codes indicating delay quantities. The data output terminals are configured to provide delayed data signals responsive to the skewed data signals. The delayed data signals are delayed by the delay elements relative to the skewed data signals by the delay quantities indicated by the delay codes. The control circuitry is electrically connected to the delay adjustment terminals. The control circuitry is configure to provide the delay codes to the delay adjustment terminals. The delay codes are selected to reduce a timing skew of the delayed data signals relative to a timing skew of the skewed data signals.

In some embodiments an electrical system includes a first device, transmission lines, and a second device. The first device includes first input/output terminals are configured to provide data signals. The transmission lines are electrically connected to the first input/output terminals of the first device. At least one of the transmission lines has a transmission delay associated therewith that is different from one or more other transmission delays associated with one or more other transmission lines of the transmission lines. The second device includes second input/output terminals, delay elements, and control circuitry. The second input/output terminals are electrically connected to the transmission lines. The second input/output terminals are configured to receive skewed data signals via the transmission lines. The skewed data signals have skewed timing relative to the data signals. The delay elements are electrically connected to the second input/output terminals. The delay elements are configured to receive the skewed data signals and provide delayed data signals. Delays associated with the delay elements are electrically controllable responsive to delay codes provided to the delay elements. The control circuitry is configured to provide the delay codes to the delay elements. The delay codes are selected to reduce skewed timing of the delayed data signals relative to the skewed timing of the skewed data signals.

In some embodiments a method of calibrating delay elements includes providing delay codes to delay elements, delaying, by the delay elements, skewed data signals comprising known data values by delay quantities indicated by the delay codes to provide delayed data signals, sampling the delayed data signals, and comparing the sampled data signals to the known data values. The method also includes repeating the providing, delaying, sampling, and comparing operations for one or more other sets of delay codes corresponding to other delay quantities, and selecting those of the delay codes and the one or more other delay codes that correspond to correct comparisons between the sampled data signals and the known data values.

FIG. 1 is a block diagram of an electrical system 100, according to some embodiments. The electrical system 100 includes a first device 130, a second device 134, and transmission lines 160a-160c electrically connected between the first device 130 and the second device 134. The first device 130 includes output buffers 104a-104c electrically connected to first input/output terminals 158a-158c. The first input/output terminals 158a-158c configured to provide data signals 150a-150c to the second device 134 through the transmission lines 160a-160c. In some embodiments the first device 130 includes a computing host and the second device 134 includes a memory device. In such embodiments the data signals 150a-150c may include data signals DQ for a memory write operation. For example, FIG. 1 illustrates that data signals DQ[0], DQ[1], . . . , and DQ[N] are provided from the first device 130 to the second device 134.

At least one of the transmission lines 160a-160c has a transmission delay associated therewith that is different from one or more other transmission delays associated with one or more others of the transmission lines 160a-160c. By way of non-limiting example, the transmission line 160b is illustrated as including a longer length than either of the transmission line 160a and the transmission line 160c, corresponding to a longer transmission delay.

The second device 134 includes second input/output terminals 162a-162c electrically connected to the transmission lines 160a-160c. The second input/output terminal 162a-162c are configured to receive skewed data signals 142a-142c via the transmission lines 160a-160c. Since the transmission lines 160a-160c have different transmission delays, the skewed data signals 142a-142c have skewed timing relative to the data signals 150a-150c.

The second device 134 also includes delay elements 126a-126c electrically connected to the second input/output terminals 162a-162c (e.g., via input buffers 106a-106c). The delay elements 126a-126c are configured to receive the skewed data signals 142a-142c and provide delayed data signals 144a-1.44c, Delays associated with the delay elements 126a-126c are electrically controllable responsive to delay codes 146 provided to the delay elements 126a-126c. Specifically, the delay elements 126a-126c include data input terminals 136a-136c, delay adjustment terminals 140a-140c, and data output terminals 138a-138c. The data input terminals 136a-136c are configured to receive the skewed data signals 142a-142c. The delay adjustment terminals 140a-140c are configured to receive delay codes 146 indicating delay quantities. The data output terminals 138a-138c are configured to provide delayed data signals responsive to the skewed data signals and the delay codes 146. The delayed data signals 144a-144c are delayed by the delay elements 126a-126c relative to the skewed data signals 142a-142c by the delay quantities indicated by the delay codes 146. The second device 134 further includes control circuitry 108 configured to provide the delay codes 146 to the delay elements 126a-126c. The first device 130 also includes input buffers 106a-106c electrically connected between the second input/output terminals 162a-162c and the delay elements 126a-126c. The control circuitry 108 is configured to provide duty codes 148 to the input buffers 106a-106c to adjust duties of the skewed data signals 142a-142c.

The second device 134 also includes sample circuitry 152 electrically connected to the data output terminals 138a-138c of the delay elements 126a-126c. The sample circuitry is configured to sample the delayed data signals 144a-144c. By way of non-limiting example, the sample circuitry 152 may include latches 118a, 118b, 120a, 120b, 122a, 122b configured to latch the delayed data signals 144a-144b responsive to a clock signal 124. Latches 118a, 118b may correspond to the delay element 126a (e.g., for DQ[0]), latches 120a, 120b may correspond to the delay element 126b (e.g., for DQ[1]), and latches 122a, 122b may correspond to the delay element 126c (e.g., for DQ[N]). Accordingly, each one of the DQ signals may include a pair of differential signals including an even DQ signal and an odd DQ signal. In the embodiment illustrated in FIG. 1 the delay elements 126a-126c may adjust delay on a DQ by DQ basis, or in other words, per pair of differential DQ signals.

The second device 134 further includes comparator circuitry 156 and pattern generation circuitry 110. The pattern generation circuitry 110 is configured to generate comparison signals 154 including known data values and provide the comparison signals 154 to the comparator circuitry 156. The comparator circuitry 156 includes comparators 112a, 112b, 114a, 114b, 116a, 116b. The comparators 112a, 112b are electrically connected to the latches 118a, 118b. The comparators 114a, 114b are electrically connected to the latches 120a, 120b. The comparators 116a, 116b are electrically connected to the latches 122a, 122b. The comparator circuitry 156 is configured to compare the sampled data signals to the known data values, indicated by the comparison signals 154, for the skewed data signals 142a-142c responsive to different delay codes 146 corresponding to different delay quantities to calibrate the delay quantities. The comparator circuitry 156 may perform the comparisons responsive to a delayed version of the clock signal 124. Accordingly, the second device 134 may include a clock delay element 128 configured to delay the clock signal 124. The delay added by the clock delay element 128 may provide sufficient time for the sample circuitry 152 to sample the delayed data signal 144a-144c to enable the comparator circuitry 156 to perform the comparisons.

The control circuitry 108 is configured to select the delay codes 146 and/or the duty codes 148 to reduce the skewed timing of the delayed data signals 144a-144c as compared to the skewed timing of the skewed data signals 142a-142c received by the delay elements 126a-126c. The control circuitry 108 is configured to calibrate the delay codes 146 (e.g., using a method 1200 of FIG. 12) by applying different delay codes 146 to the delay elements 126a-126c (e.g., on a DQ per DQ basis) and selecting those of the delay codes 146 that correspond to correct comparisons between the delayed data signals 144a-144c and the comparison signals 154. To enable the calibration operation, the first device 130 includes pattern generation circuitry 102 configured to generate a pattern of known data values for the data signals 150a-150c. The second device 134 includes pattern generation circuitry 110 configured to generate the same pattern of known data values for comparison signals 154.

During a calibration operation the pattern generation circuitry 102 may generate the data signals 150a-150c including the known data values (the same known data values indicated by the comparison signals 154 provided by the pattern generation circuitry 110) and deliver the data signals 150a-150c to the output buffers 104a-104c. Each of the data signals 150a-150c may include a stream of the known data values. The output buffers 104a-104c may provide the data signals 150a-150c to the transmission lines 160a-160c via the first input/output terminals 158a-158c. The data signals 150a-150c may become skewed, and the transmission lines 160a-160c may deliver the skewed data signals 142a-142c to the second input/output terminals 162a-162c of the second device 134.

The second input/output terminals 162a-162c may deliver the skewed data signals 142a-142c to the input buffers 106a-106c, which in turn may deliver the skewed data signals 142a-142c to the data input terminals 136a-136c of the delay elements 126a-126c. The control circuitry 108 may deliver first values for the delay codes 146 to the delay elements 126a-126c via the delay adjustment terminals 140a-140c. Accordingly, delivery of the delayed data signals 144a-144c to the sample circuitry 152, via the data output terminals 138a-138c, may be delayed by the delay quantities indicated by the first values for the delay codes 146. The sample circuitry 152 may latch the delayed data signals 144a-144c responsive to the clock signal 124, and the comparator circuitry 156 may compare the latched values of the delayed data signals 144a-144c to the comparison signals 154. The comparator circuitry 156 may indicate, to the control circuitry 108, whether the values latched to the sample circuitry 152 are the same as the known values indicated by the comparison signals 154.

The control circuitry 108 may then modulate the delay codes 146 and receive an indication as to whether the resulting values latched to the sample circuitry 152 match the known values indicated by the comparison signals 154. The control circuitry 108 may repeat the modulation of the delay codes 146 for multiple different values of the delay codes 146, and select those of the multiple different values, for each one of the delay elements 126a-126c, that correspond to correct comparisons between the latched values of the delayed data signals 144a-144c and the known data values of the comparison signals 154. In this way the control circuitry 108 may calibrate the delay elements 126a-126c. Similar calibration operations may be performed for the input buffers 106a-106c (e.g., modulation through different values of the duty codes 148 to calibrate the input buffers 106a-106c).

In embodiments where the processors' first device 130 is a computing host and the second device 134 is a memory device (e.g., as discussed below with reference to FIG. 9), the electrical system 100 may perform a write operation. Data signals including data to be written to a memory core of the memory device may be provided (e.g., by a processing core of the computing host) to the output buffers 104a-104c, which may buffer the data signals and provide the data signals to the transmission lines 160a-160c. The transmission line 160a-160c may deliver skewed data signals to the memory device. The input buffers 106a-106c may buffer the skewed data signals (e.g., correcting the duty of the skewed data signals responsive to duty codes 148 provided by the control circuitry 108) and provide the skewed data signals to the delay elements 126a-126c. The delay elements 126a may reduce skew of the skewed data signals by adding delay responsive to the delay codes 146 provided by the control circuitry 108, and provide the delayed data signals to the sample circuitry 152. Responsive to the clock signal 124 the sample circuitry 152 may sample the delayed data signals to latch bits of data to be written to the memory core of the memory device. Since the write operation utilizes the same output buffers 104a-104c, channel 132, input buffers 106a-106c, and delay elements 126a-126c used to calibrate the delay codes 146 and the duty codes 148, the calibrated delay codes 146 and duty codes 148 may reduce skew and duty distortion of the delayed data signals as compared to the skewed data signals during a write operation.

Figure 2:
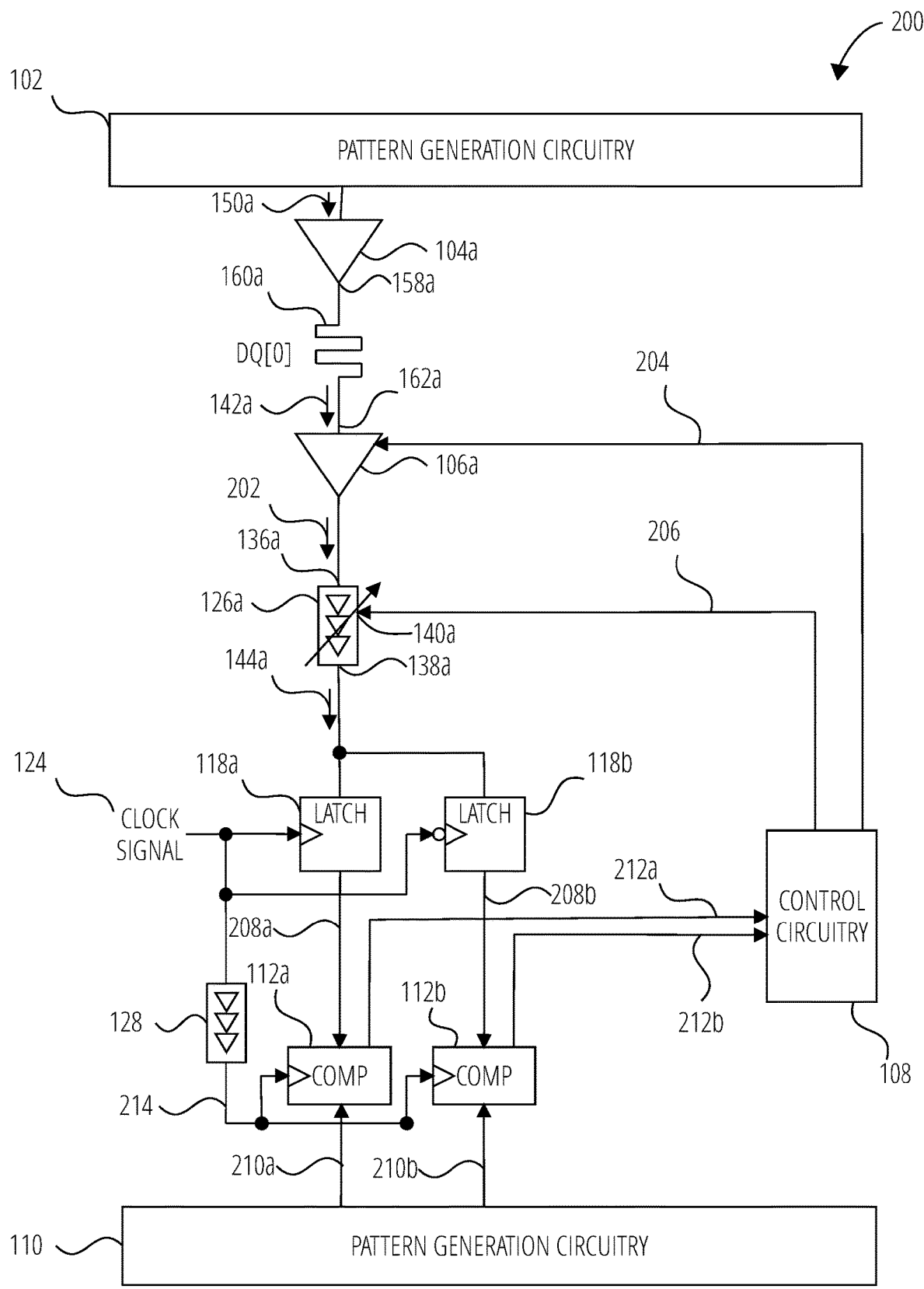
FIG. 2 is a block diagram of a portion of the electrical system of FIG. 1.

FIG. 2 is a block diagram of a portion 200 of the electrical system 100 of FIG. 1. The portion 200 includes the pattern generation circuitry 102, the output buffer 104a, the first input/output terminal 158a, the transmission line 160a, the second input/output terminal 162a, the input buffer 106a, the delay element 126a (which includes the data input terminal 136a, the delay adjustment terminal 140a, and the data output terminal 138a), the latches 118a, 118b, the clock delay element 128, the comparators 112a, 112b, the pattern generation circuitry 110, and the control circuitry 108 discussed above with reference to FIG. 1. FIG. 2 also illustrates the data signal 150a, the skewed data signal 142a, and the delayed data signal 144a discussed above with reference to FIG. 1.

FIG. 2 also illustrates a duty code 204 provided by the control circuitry 108 to the input buffer 106a and a delay code 206 provided by the control circuitry 108 to the delay adjustment terminal 140a of the delay element 126a. The duty code 204 is one of the duty codes 148 discussed above with reference to FIG. 1 and the delay code 206 is one of the delay codes 146 discussed above with reference to FIG. 1. In addition, FIG. 2 illustrates a duty-altered data signal 202 provided by the input buffer 106a to the data input terminal 136a of the delay element 126a responsive to the skewed data signal 142a received at the second input/output terminal 162a. The duty-altered data signal 202 has a duty that has been modified relative to a duty of the skewed data signal 142a responsive to the duty code 204. For example, the duty-altered data signal 202 may have a duty that is altered, relative to the duty of the skewed data signal 142a, by a duty quantity that is indicated by the duty code 204.

Furthermore, FIG. 2 illustrates latched even data bits 208a provided by the latch 118a to the comparator 112a, and latched odd data bits 208b provided by the latch 118b to the comparator 112b. In addition, FIG. 2 illustrates comparison signals 210a, 210b, which are two of the comparison signals 154 discussed above with reference to FIG. 1. The comparator 112a is configured to compare the latched even data bits 208a to the comparison signal 210a, and indicate whether the latched even data bits 208a pass the comparison using a comparison result 212a, which the comparator 112a provides to the control circuitry 108. Similarly, the comparator 112b is configured to compare the latched odd data bits 208b to the comparison signal 210b, and indicate whether the latched odd data bits 208b pass the comparison using a comparison result 212b, which the comparator 112b provides to the control circuitry 108. As a result, the control circuitry 108 may be informed as to whether the delay introduced by the delay element 126a enables latching, by the latch 118a and the latch 118b, of correct data values.

The portion 200 of the electrical system 100 of FIG. 1 is illustrated in FIG. 2 to illustrate a method 300 of calibrating the electrical system 100, as will be discussed in more detail with reference to FIG. 3 below.

Figure 3:
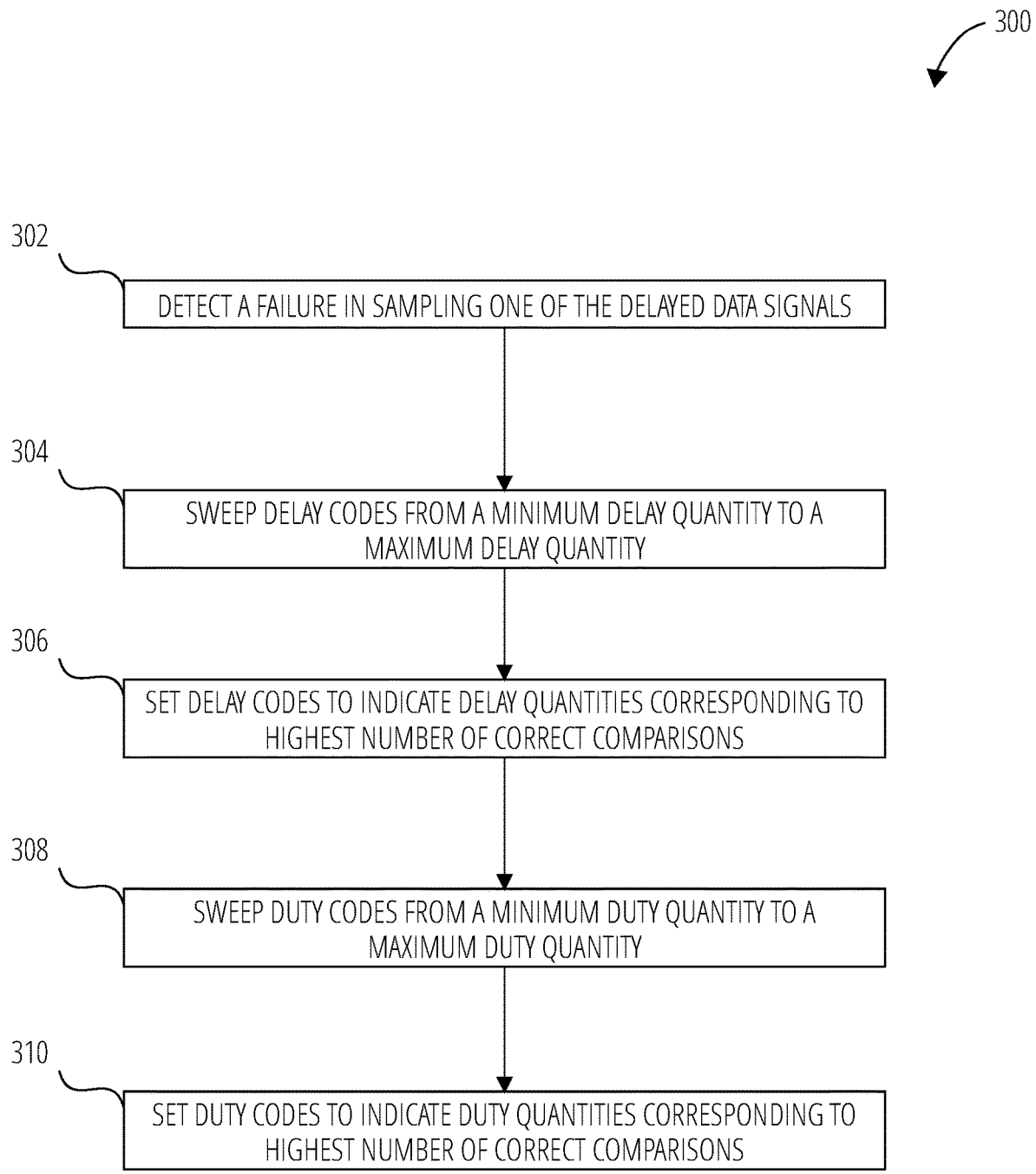
FIG. 3 is a flowchart illustrating a method of operating the electrical system of FIG. 1, according to some embodiments.
Figure 4B:
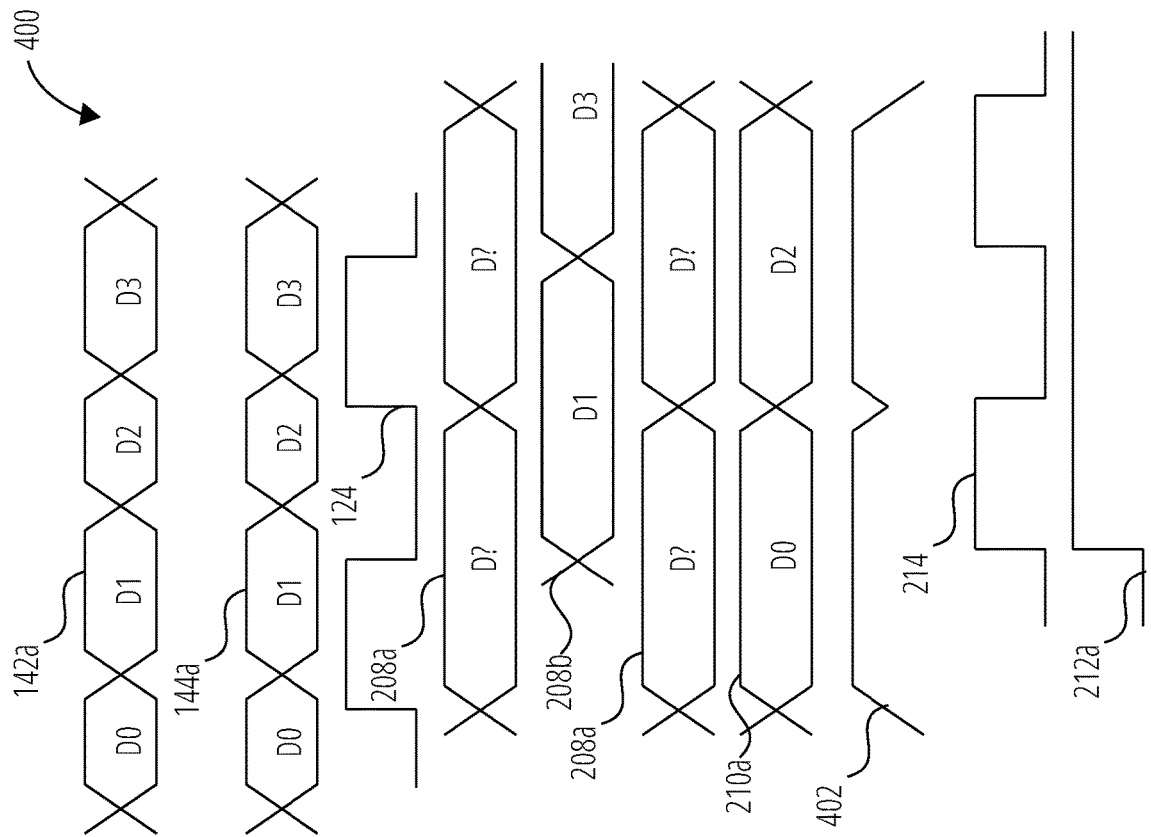
FIG. 4B is a signal timing diagram of the signals of the portion of FIG. 2 responsive to a minimum delay quantity provided from control circuitry to a delay element in a delay code.
Figure 4A:
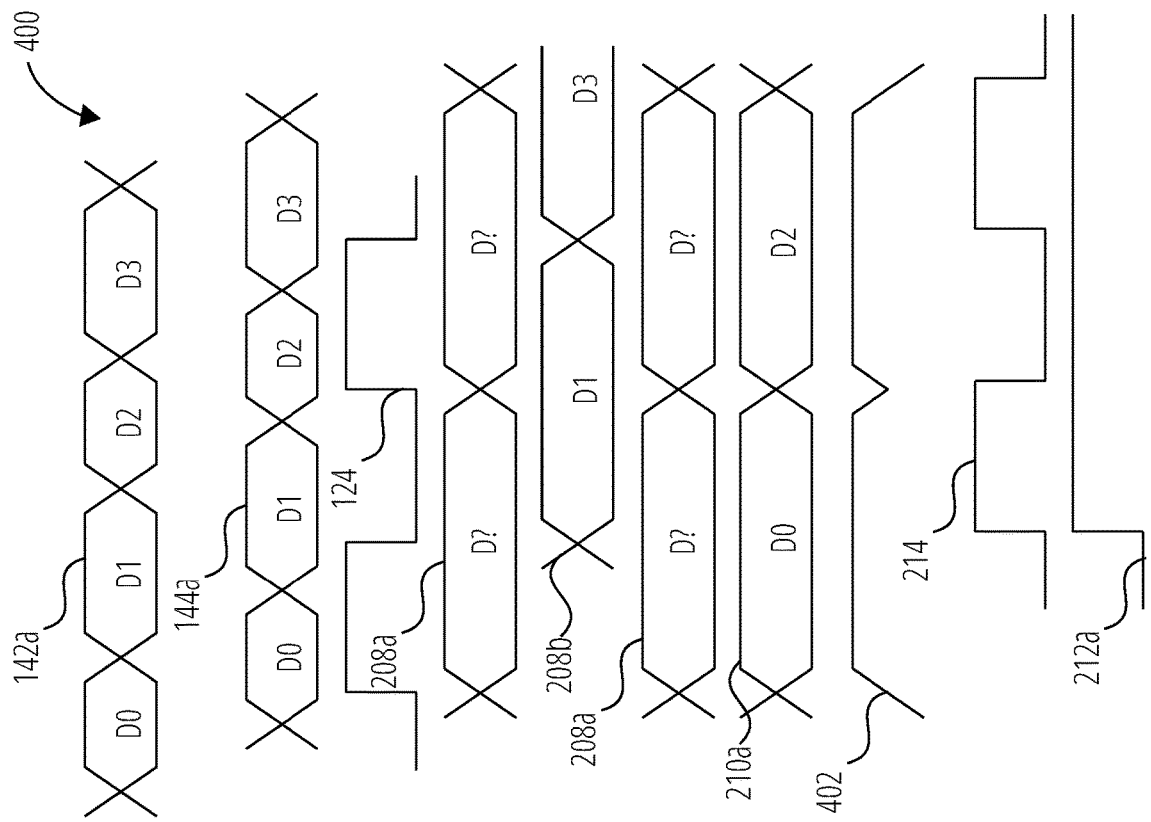
FIG. 4A is a signal timing diagram of signals of the portion of FIG. 2 illustrating a failure in sampling one of the delayed data signals.

FIG. 3 is a flowchart illustrating a method 300 of operating the electrical system 100 of FIG. 1, according to some embodiments. Referring to FIG. 2 and FIG. 3 together, at operation 302 the method 300 includes detecting a failure in sampling one of the delayed data signals 144a-144c (FIG. 1). By way of non-limiting example, due to temporal misalignment, or in other words skew, between the delayed data signals 144a-144c and the clock signal 124, which triggers the latches 118a, 118b, 120a, 120b, 122a, 122b (FIG. 1) to latch the delayed data signals 144a-144c, the comparator circuitry 156 (FIG. 1) may fail to properly latch all the bits of the delayed data signals 144a-144c. FIG. 4A illustrates an example of a detection of a failure in sampling one of the delayed data signals 144a-144c.

FIG. 4A is a signal timing diagram of signals 400 of the portion 200 of FIG. 2 illustrating a failure in sampling one of the delayed data signals 144a-144c. Referring to FIG. 2, FIG. 3, and FIG. 4A together, the signals 400 include the skewed data signal 142a, the delayed data signal 144a, the clock signal 124, the latched even data bits 208a, the latched odd data bits 208b, the comparison signal 210a, the delayed clock signal 214, and the comparison result 212a of FIG. 2. The signals 400 also include a pass/fail indication 402, which may be driven to a logic level high voltage potential responsive to a detected failure (e.g., failure to determine that the latched even data bits 208a are equal to the comparison signal 210a), and to a logic level low voltage potential responsive to a detected pass (e.g., a determination that the latched even data bits 208a are equal to the comparison signal 210a).

By way of non-limiting example, the skewed data signal 142a include bits D0, D1, D2, and D3. As illustrated in FIG. 4A, the skewed data signal 142a may manifest some temporal misalignment with the clock signal 124. The skewed data signal 142a may also manifest some duty distortion (e.g., bits D0 and D2 are shorter in time than D1 and D3).

The delayed data signal 144a is a delayed version of the skewed data signal 142a. Rising edges of the clock signal 124 may be used to trigger the latch 118a to sample the even bits of the delayed data signal 144a (bits D0 and D2), and falling edges of the clock signal 124 may be used to trigger the latch 118b to sample the odd bits of the delayed data signal (bits D1 and D3). Although the falling edges of the clock signal 124 may align with sufficiently settled portions of the odd data bits D1 and D3 of the delayed data signal 144a to enable the latch 118b to sample correct values for the odd data bits D1 and D3, the rising edges of the clock signal 124 may be too close to transitions between bits of the delayed data signal 144a to sample correct values for the even data bits D0 and D2. As a result, although the latched odd data bits 208b indicate correct values for odd bits D1 and D3, the latched even data bits 208a may not indicate correct values for even bits D0 and D2. Accordingly, in the latched even data bits 208a the bits are indicated as "D?" and the pass/fail indication 402 is shown at logic level high voltage potentials to indicate failures to latch the even bits D0 and D2.

The delayed clock signal 214 is a delayed version of the clock signal 124 (e.g., delayed by the clock delay element 128). The delayed clock signal 214 triggers the comparator 112a to compare the comparison signal 210a, which includes the even data bits D0 and D2, to the latched even data bits 208a. Since the proper even data bits D0 and D2 were not latched, the comparator 112a may signal a failure on the comparison result 212a (e.g., by driving the comparison result 212a to a logic level high voltage potential). Accordingly, the control circuitry 108 may detect the failure in sampling the delayed data signal 144a, as per operation 302 of FIG. 3, responsive to the comparison result 212a provided by the comparator 112a. Of course, any of the comparators 112a, 112b, 114a, 114b, 116a, and 116b may provide a comparison result indicating a failure to trigger the control circuitry 108 to detect a failure in sampling one of the delayed data signals 144a-144c.

At operation 304 the method 300 includes sweeping delay codes 206 from a minimum delay quantity to a maximum delay quantity. FIG. 4B illustrates the signals 400 responsive to the minimum delay quantity, FIG. 4C illustrates the signals 400 responsive to a midterm delay quantity (e.g., halfway between the minimum delay quantity and the maximum delay quantity), and FIG. 4D illustrates the signals 400 responsive to the maximum delay quantity.

FIG. 4B is a signal timing diagram of the signals 400 of the portion 200 of FIG. 2 responsive to a minimum delay quantity provided from the control circuitry 108 to the delay element 126a in the delay code 206. Referring to FIG. 2, FIG. 3, and FIG. 4B together, since the delay code 206 provided to the delay element 126a indicates the minimum delay quantity (e.g., zero delay), the delayed data signal 144a may be substantially the same as the skewed data signal 142a.

Although the falling edges of the clock signal 124 may occur at points in time when the odd data bits D1 and D3 are sufficiently settled to enable correct sampling of the odd data bits D1 and D3, the rising edges of the clock signal 124 may occur too close to the transitions between bits in the delayed data signal 144a to enable correct sampling of the even data bits D0 and D2. Accordingly, when the comparator 112a compares the latched even data bits 208a to the comparison signal 210a, the comparator 112a signals a failure to the control circuitry 108 using the comparison result 212a (e.g., by driving the comparison result 212a to a logic level high voltage potential).

FIG. 4C is a signal timing diagram of the signals 400 of the portion 200 of FIG. 2 responsive to a midterm delay quantity provided from the control circuitry 108 to the delay element 126a in the delay code 206. Referring to FIG. 2, FIG. 3, and FIG. 4C together, as part of operation 304 (sweeping delay codes) the delayed data signal 144a is delayed relative to the skewed data signal 142a by less than the amount illustrated in FIG. 4A, but more than the amount illustrated in FIG. 4B. As a result, the rising edges of the clock signal 124 align in time with settled portions of the even bits D0 and D2 of the delayed data signal 144a, and the falling edges of the clock signal 124 align in time with settled portions of the odd bits D1 and D3 of the delayed data signal 144a. Accordingly, responsive to the clock signal 124, the latch 118a and the latch 118b correctly latch the even bits D0 and D2 and the odd bits D1 and D3 to the latched even data bits 208a and the latched odd data bits 208b, respectively, corresponding to logic level low voltage potentials in the pass/fail indication 402 (passes). Responsive to the delayed clock signal 214, the comparators 112a and 112b indicate to the control circuitry 108 using the comparison result 212a that the comparisons passed (e.g., by maintaining the comparison result 212a to a logic level low voltage potential to indicate that the even bits D0 and D2 passed the comparison).

FIG. 4D is a signal timing diagram of the signals 400 of the portion 200 of FIG. 2 responsive to a maximum delay quantity provided from the control circuitry 108 to the delay element 126a in the delay code 206. Referring to FIG. 2, FIG. 3, and FIG. 4D together, as part of operation 304 (sweeping delay codes) the delayed data signal 144a is delayed relative to the skewed data signal 142a by a maximum delay quantity, which is more than the delay quantities illustrated in FIG. 4A, FIG. 4B, and FIG. 4C. With the delayed data signal 144a delayed by the maximum delay quantity the rising and falling edges of the clock signal 124 do not align with settled portions of the delayed data signal 144a. As a result both the latched even data bits 208a and the latched odd data bits 208b may include incorrect values, the pass/fail indication 402 indicates fails, and the comparison result 212a indicates a fail.

At operation 306 the method 300 includes setting the delay codes 146 (FIG. 1) to indicate delay quantities corresponding to a highest number of correct comparisons (e.g., between the latched even data bits 208a and the comparison signals 210a, and between the latched odd data bits 208b and the comparison signals 210b for the portion 200). As previously discussed, the midterm delay quantity, as discussed with respect to FIG. 4C, resulted in all correct bits being latched. In this example the delay code 206 may be set to the mid-term delay quantity because the mid-term delay quantity resulted in the highest number of correct comparisons.

Figure 4G:
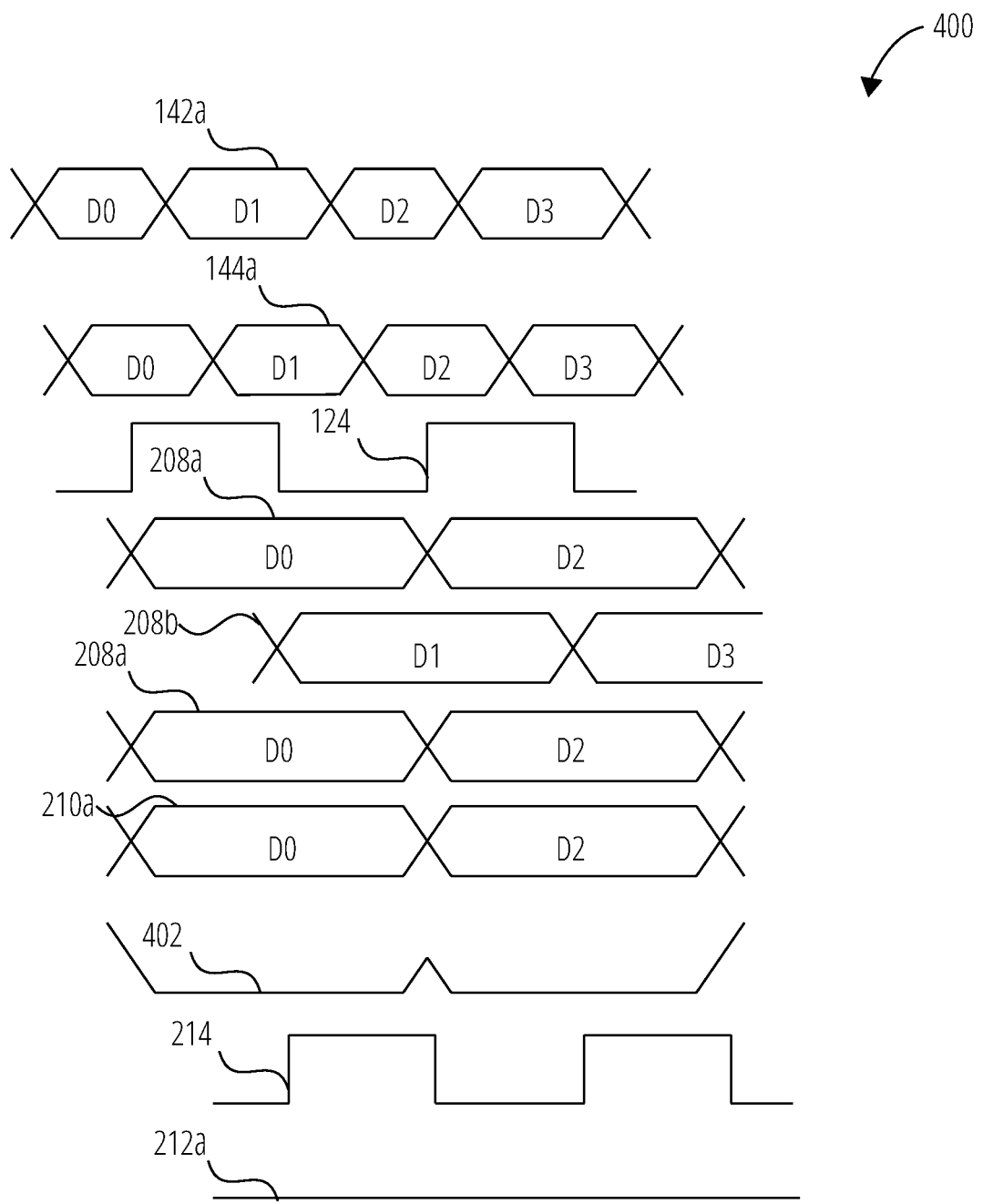
FIG. 4G is a timing diagram of the signals of the portion of FIG. 2 responsive to a selected duty quantity provided from the control circuitry to the input buffer in the duty code.

At operation 308 the method 300 includes sweeping duty codes from a minimum duty quantity to a maximum duty quantity. For example, FIG. 4E illustrates the signals 400 responsive to the minimum duty quantity, FIG. 4F illustrates the signals 400 responsive to the maximum duty quantity, and FIG. 4G illustrates the signals 400 responsive to a selected duty quantity.

FIG. 4E is a timing diagram of the signals 400 of the portion 200 of FIG. 2 responsive to a minimum duty quantity provided from the control circuitry 108 to an input buffer 106a in a duty code 204. Referring to FIG. 2, FIG. 3, and FIG. 4E together, as part of operation 308 (sweeping duty codes) duties of bits D0, D1, D2, and D3 of the delayed data signal 144a are adjusted responsive to the minimum duty quantity provided in the duty code 204. Accordingly, in FIG. 4E the delayed data signal 144a is a delayed version of the skewed data signal 142a (e.g., delayed by the mid-term delay code, which was set in operation 306) with the duty adjusted, relative to the skewed data signal 142a, by the amount indicated by the minimum duty quantity.

With the delayed data signal 144a having its duty adjusted by the minimum duty quantity the falling edges of the clock signal 124 align with settled portions of the odd bits D1 and D3 of the delayed data signal 144a. The rising edges of the clock signal 124, however, do not align with settled portions of the even bits D0 and D2 of the delayed data signal 144a. Accordingly, the latch 118a may sample incorrect values for the even bits to the latched even data bits 208a, the pass/fail indication 402 may indicate failures, and the comparison result 212a may indicate failure.

FIG. 4F is a timing diagram of the signals 400 of the portion 200 of FIG. 2 responsive to a maximum duty quantity provided from the control circuitry 108 to the input buffer 106a in the duty code 204. Referring to FIG. 2, FIG. 3, and FIG. 4F together, as part of operation 308 (sweeping duty codes) duties of bits D0, D1, D2, and D3 of the delayed data signal 144a are adjusted responsive to the maximum duty quantity provided in the duty code 204. Accordingly, in FIG. 4F the delayed data signal 144a is a delayed version of the skewed data signal 142a (e.g., delayed by the mid-term delay code, which was set in operation 306) with the duty adjusted, relative to the skewed data signal 142a, by the amount indicated by the maximum duty quantity. As illustrated in FIG. 4F, the duties of the even bits D0 and D2 of the delayed data signal 144a have been increased and the duties of the odd bits D1 and D3 of the delayed data signal 144a have been decreased, relative to those of the skewed data signal 142a.

With the delayed data signal 144a having its duty adjusted by the maximum duty quantity the rising edges of the clock signal 124 align with settled portions of the even bits D0 and D2 of the delayed data signal 144a. The falling edges of the clock signal 124, however, do not align with settled portions of the odd bits D1 and D3 of the delayed data signal 144a. Accordingly, the latch 118b may sample incorrect values for the odd bits to the latched odd data bits 208b, the pass/fail indication 402 may indicate failures, and the comparison result 212b may indicate failure.

FIG. 4G is a timing diagram of the signals 400 of the portion 200 of FIG. 2 responsive to a selected duty quantity provided from the control circuitry 108 to the input buffer 106a in the duty code 204. Referring to FIG. 2, FIG. 3, and FIG. 4G together, at operation 310 the method 300 includes setting the duty codes 148 (FIG. 1) to indicate duty quantities corresponding to a highest number of correct comparisons. In FIG. 4G the duty code 204 is set to a selected duty quantity that corresponds to the highest number of correct comparisons between the latched even data bits 208a and the comparison signals 210a, and between the latched odd data bits 208b and the comparison signals 210b. In some embodiments several different duty quantities between the minimum duty quantity and the maximum duty quantity may be checked at operation 308.

The latched even data bits 208a and the latched odd data bits 208b reflect correct values of the bits D0, D1, D2, and D3. Accordingly, responsive to the delayed clock signal 214 the pass/fail indication 402 indicates passes and the comparison result 212a indicates a pass. Although not shown in FIG. 4G, the comparison result 212b would also indicate a pass.

It is noted that in FIG. 4E the duty distortion of the delayed data signal 144a is reduced relative to that of the skewed data signal 142a. For example, the temporal lengths of the even bits D0 and D2 have been increased and the temporal lengths of the odd bits D1 and D3 have been decreased. As a result, in the delayed data signal 144a the even bits D0 and D2 may be of substantially the same time lengths as those of the odd bits D1 and D3. In contrast, the even bits D0 and D2 of the skewed data signal 142a are shorter in time than the odd bits D1 and D3 of the skewed data signal 142a.

Figure 5:
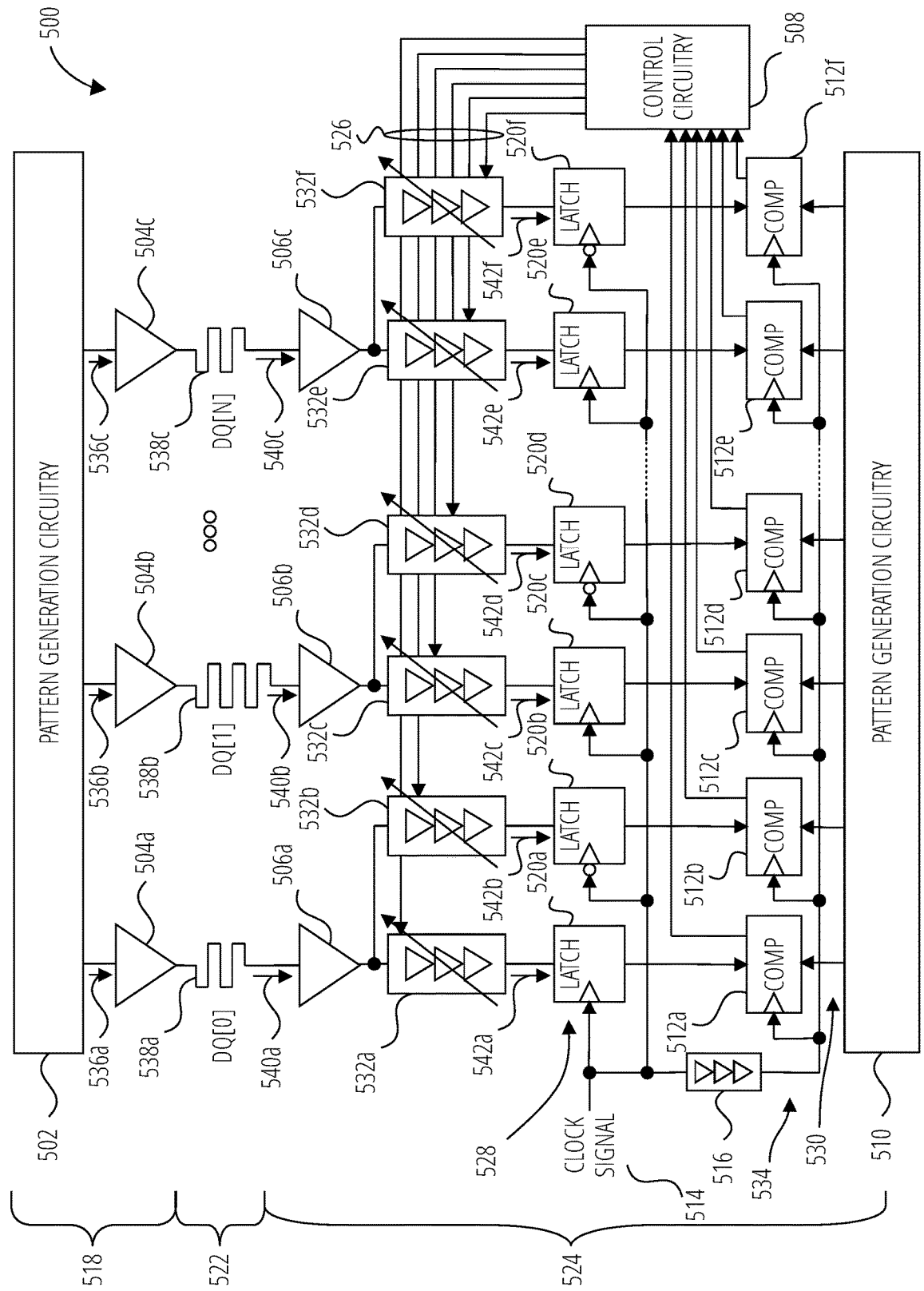
FIG. 5 is a block diagram of another electrical system, according to some embodiments.

FIG. 5 is a block diagram of another electrical system 500, according to some embodiments. The electrical system 500 includes a first device 518 and a channel 522 similar to the first device 130 and the channel 132 discussed with reference to FIG. 1. For example, the first device 518 includes pattern generation circuitry 502 and output buffers 504a-504c similar to the pattern generation circuitry 102 and the output buffers 104a-104c discussed with reference to FIG. 1. Also, the channel 522 includes transmission lines 538a-538c similar to the transmission lines 160a-160c discussed with reference to FIG. 1. The pattern generation circuitry 502 is configured to provide data signals 536a-536c to the output buffers 504a-504c, which deliver the data signals 536a-536c to the transmission lines 538a-538c. The transmission lines 538a deliver skewed data signals 540a-540c to a second device 524 of the electrical system 500.

The second device 524 is similar to the second device 134 of FIG. 1 except that the second device 524 is configured to adjust delays of the skewed data signals 540a-540c on a bit-by-bit basis rather than on a DQ by DQ basis, as is performed by the second device 134 of FIG. 1. Also, the electrical system 500 may not be configured to adjust duties of the skewed data signals 540a-540c, as is performed by the second device 134 of FIG. 1. Of course, duty adjustment similar to that discussed above may be performed by the second device 524 without departing from the scope of the disclosure.

The second device 524 includes input buffers 506a-506c configured to receive the skewed data signals 540a-540c. The second device 524 also includes delay elements 532a-532f configured to delay the skewed data signals 540a-540c to generate delayed data signals 542a-542f responsive to delay codes 526 provided by control circuitry 508 of the second device 524 to the delay elements 532a-532f. The second device 524 also includes sample circuitry 528 including latches 520a-520f configured to latch values of the delayed data signals 542a-542f responsive to a clock signal 514. The second device 524 further includes pattern generation circuitry 510 configured to generate comparison signals 530, and comparator circuitry 534 including comparators 512a-512f configured to compare the latched values latched by the sample circuitry 528 to the comparison signals 530. The pattern generation circuitry 510 is configured to generate the same data as the pattern generation circuitry 502 to enable calibration of the delay codes 526. The second device 524 includes a clock delay element 516 configured to delay the clock signal 514 to generate a delayed clock signal (not shown) to trigger the comparator circuitry 534 to compare the latched data bits to the comparison signals 530.

In some embodiments the first device 518 may be a computing host and the second device 524 may be a memory device. In such embodiments the electrical system 500 may include memory data input/output lines DQ[0], DQ[1], ..., DQ[N].

Figure 6:
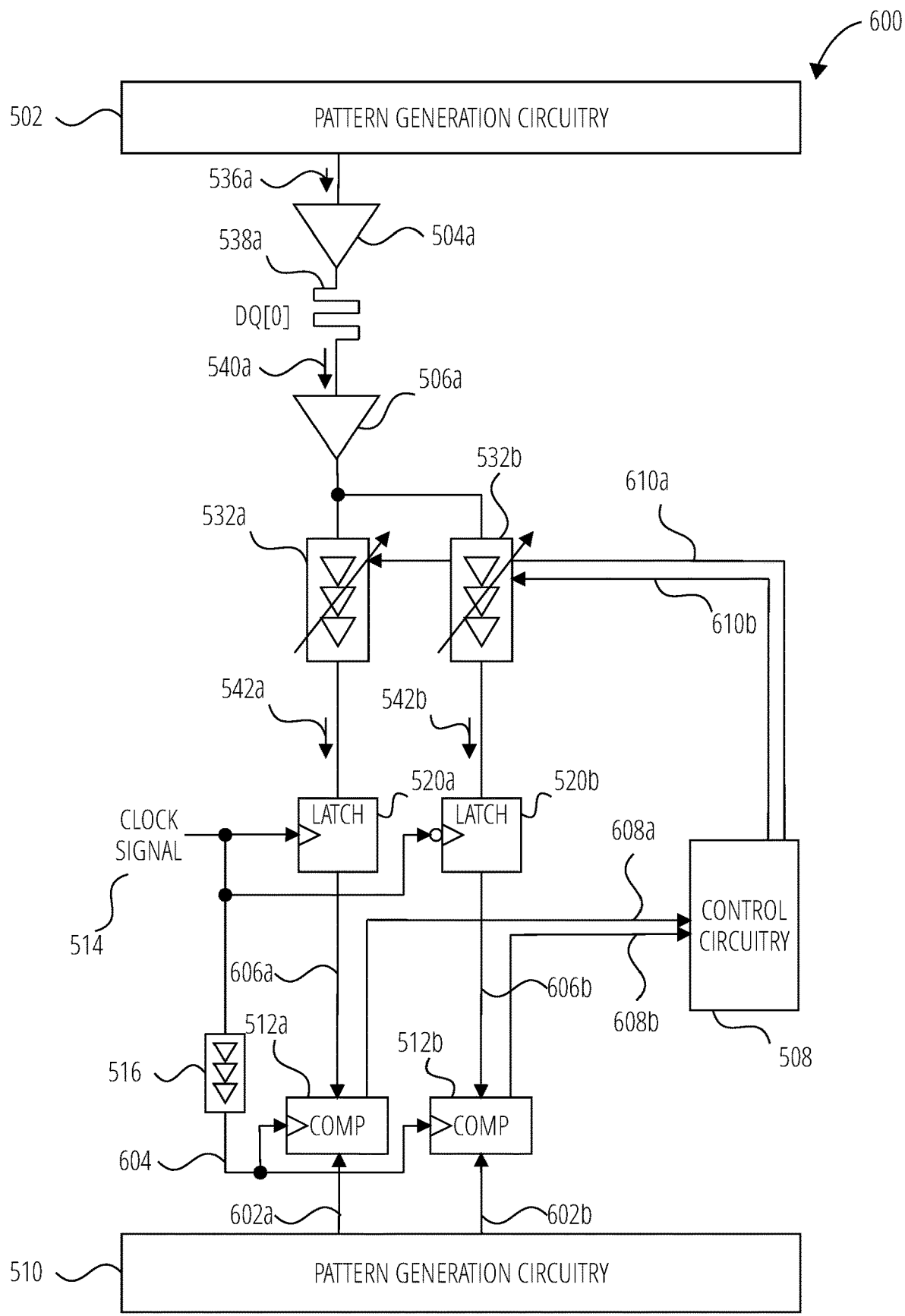
FIG. 6 is a block diagram of a portion of the electrical system of FIG. 5.

FIG. 6 is a block diagram of a portion 600 of the electrical system 500 of FIG. 5. The portion 600 includes the pattern generation circuitry 502, the output buffer 504a, the transmission line 538a, the input buffer 506a, the delay elements 532a and 532b, the latches 520a and 520b, the clock delay element 516, the comparators 512a and 512b, the pattern generation circuitry 510, and the control circuitry 508 discussed above with reference to FIG. 5. FIG. 6 also illustrates the data signal 536a, the skewed data signal 540a, and the delayed data signals 542a and 542b discussed above with reference to FIG. 5.

FIG. 6 also illustrates delay codes 610a and 610b provided by the control circuitry 508 to the delay elements 532a and 532b. The delay codes 610a and 610b are two of the delay codes 526 discussed above with reference to FIG. 5.

Furthermore, FIG. 6 illustrates latched even data bits 606a provided by the latch 520a to the comparator 512a, and latched odd data bits 606b provided by the latch 520b to the comparator 512b. In addition, FIG. 6 illustrates comparison signals 602a and 602b, which are two of the comparison signals 530 discussed above with reference to FIG. 5. The comparator 512a is configured to compare the latched even data bits 606a to the comparison signal 602a, and indicate whether the latched even data bits 606a pass the comparison using a comparison result 608a, which the comparator 512a provides to the control circuitry 508. Similarly, the comparator 512b is configured to compare the latched odd data bits 606b to the comparison signal 602b, and indicate whether the latched odd data bits 606b pass the comparison using a comparison result 608b, which the comparator 512b provides to the control circuitry 508. As a result, the control circuitry 508 may be informed as to whether the delays introduced by the delay elements 532a and 532b enable latching, by the latch 520a and the latch 520b, of correct data values.

The portion 600 of the electrical system 500 of FIG. 5 is illustrated in FIG. 6 to illustrate a method 700 of calibrating the electrical system 500, as will be discussed in more detail with reference to FIG. 7 below.

Figure 7:
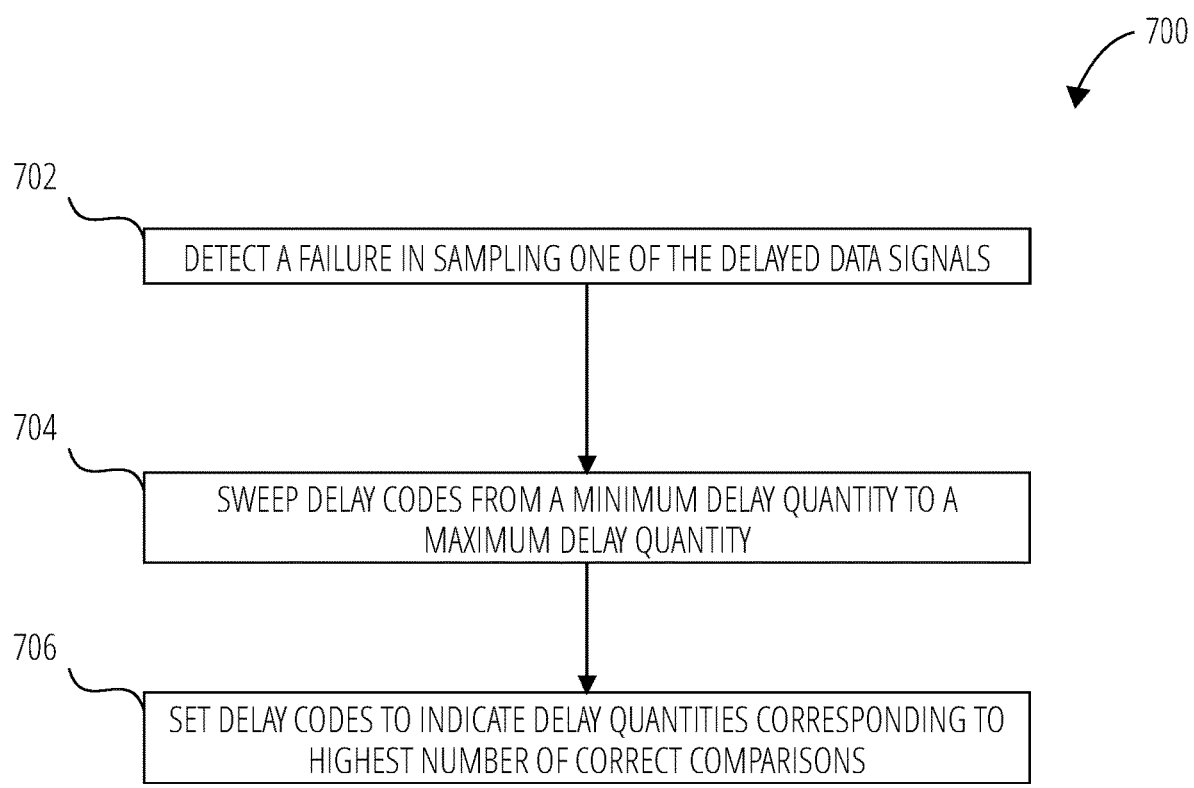
FIG. 7 is a flowchart illustrating a method of operating the electrical system of FIG. 5, according to some embodiments.

FIG. 7 is a flowchart illustrating a method 700 of operating the electrical system 500 of FIG. 5, according to some embodiments. Referring to FIG. 6 and FIG. 7 together, at operation 702 the method 700 includes detecting a failure in sampling one of the delayed data signals 542a-542f (FIG. 5). By way of non-limiting example, due to temporal misalignment, or in other words skew, between the delayed data signals 542a-542f and the clock signal 514, which triggers the latches 520a-520f (FIG. 5) to latch the delayed data signals 542a-542f, the comparator circuitry 534 (FIG. 5) may fail to properly latch all the bits of the delayed data signals 542a-542f. FIG. 8A illustrates an example of a detection of a failure in sampling one of the delayed data signals 542a-542f.

FIG. 8A is a signal timing diagram of signals 800 of the portion 600 of FIG. 6 illustrating a failure in sampling one of the delayed data signals 542a-542f. Referring to FIG. 6, FIG. 7, and FIG. 8A together, the signals 800 include the skewed data signal 540a, the delayed data signals 542a and 542b, the clock signal 514, the latched even data bits 606a, the latched odd data bits 606b, the comparison signal 602a, the delayed clock signal 604, and the comparison result 608a of FIG. 6. The signals 800 also include a pass/fail indication 802, which may be driven to a logic level high voltage potential responsive to a detected failure (e.g., failure to determine that the latched even data bits 606a are equal to the comparison signal 602a), and to a logic level low voltage potential responsive to a detected pass (e.g., a determination that the latched even data bits 606a are equal to the comparison signal 602a).

By way of non-limiting example, the skewed data signal 540a includes bits D0, D1, D2, and D3. As illustrated in FIG. 8A, the skewed data signal 540a may manifest some temporal misalignment with the clock signal 514. The skewed data signal 540a may also manifest some duty distortion (e.g., bits D0 and D2 are shorter in time than D1 and D3).

The delayed data signals 542a and 542b are delayed versions of even and odd parts, respectively, of the skewed data signal 540a. Rising edges of the clock signal 514 may be used to trigger the latch 520a to sample the even bits of the delayed data signal 542a (bits D0 and D2), and falling edges of the clock signal 514 may be used to trigger the latch 520b to sample the odd bits of the delayed data signal 542b (bits D1 and D3). Although the falling edges of the clock signal 514 may align with sufficiently settled portions of the odd data bits of the delayed data signal 542b to enable the latch 520b to sample correct values for the odd data bits D1 and D3, the rising edges of the clock signal 514 may be too close to transitions between bits of the delayed data signal 542a to sample correct values for the even data bits D0 and D2. As a result, although the latched odd data bits 606b indicate correct values for odd bits D1 and D3, the latched even data bits 606a may not indicate correct values for even bits D0 and D2. Accordingly, in the latched even data bits 606a the bits are indicated as "D?" and the pass/fail indication 802 is shown at logic level high voltage potentials to indicate failures to latch the even bits D0 and D2.

The delayed clock signal 604 is a delayed version of the clock signal 514 (e.g., delayed by the clock delay element 516). The delayed clock signal 604 triggers the comparator 512a to compare the comparison signal 602a, which includes the even data bits D0 and D2, to the latched even data bits 606a. Since the proper even data bits D0 and D2 were not latched, the comparator 512a may signal a failure on the comparison result 608a (e.g., by driving the comparison result 608a to a logic level high voltage potential). Accordingly, the control circuitry 508 may detect the failure in sampling the delayed data signal 542a, as per operation 702 of FIG. 7, responsive to the comparison result 608a provided by the comparator 512a. Of course, any of the comparators 512a-512f may provide a comparison result indicating a failure to trigger the control circuitry 508 to detect a failure in correctly sampling one of the delayed data signals 542a-542f.

Figure 8D:
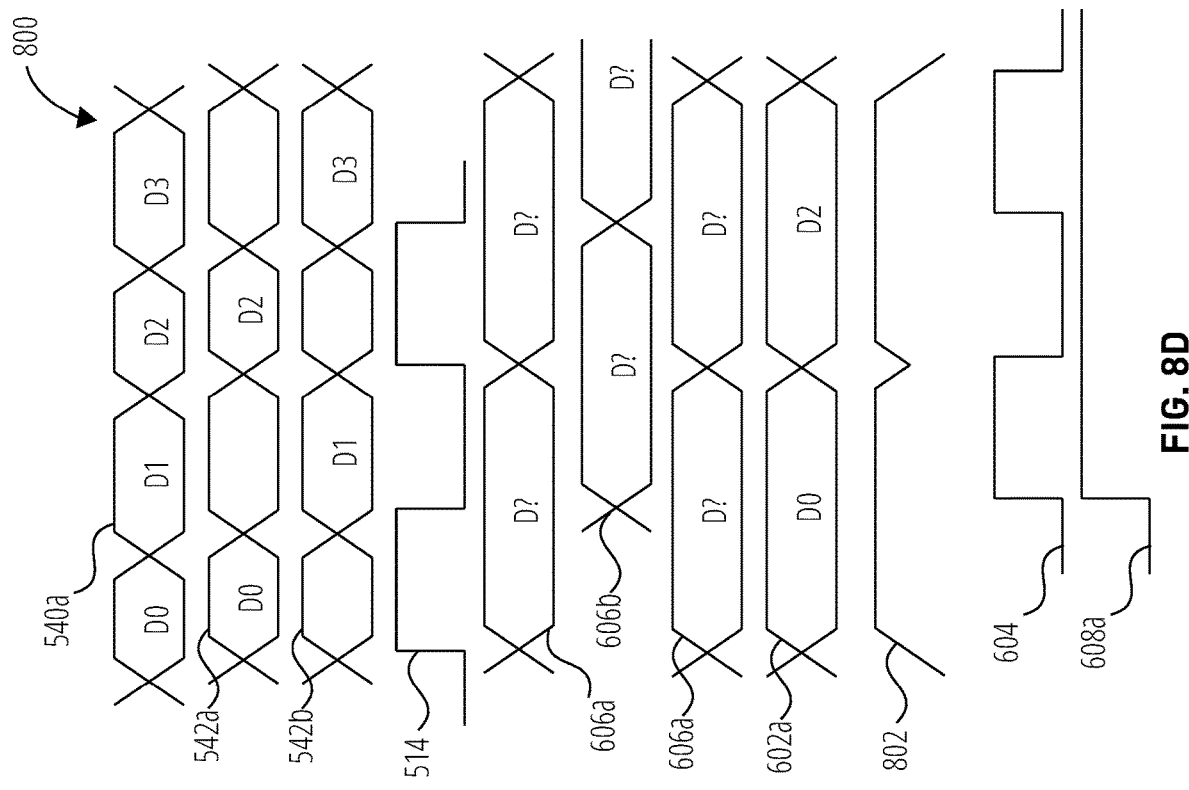
FIG. 8D is a signal timing diagram of the signals of the portion of FIG. 6 responsive to a maximum delay quantity provided from the control circuitry to the delay elements in the delay codes.
Figure 8C:
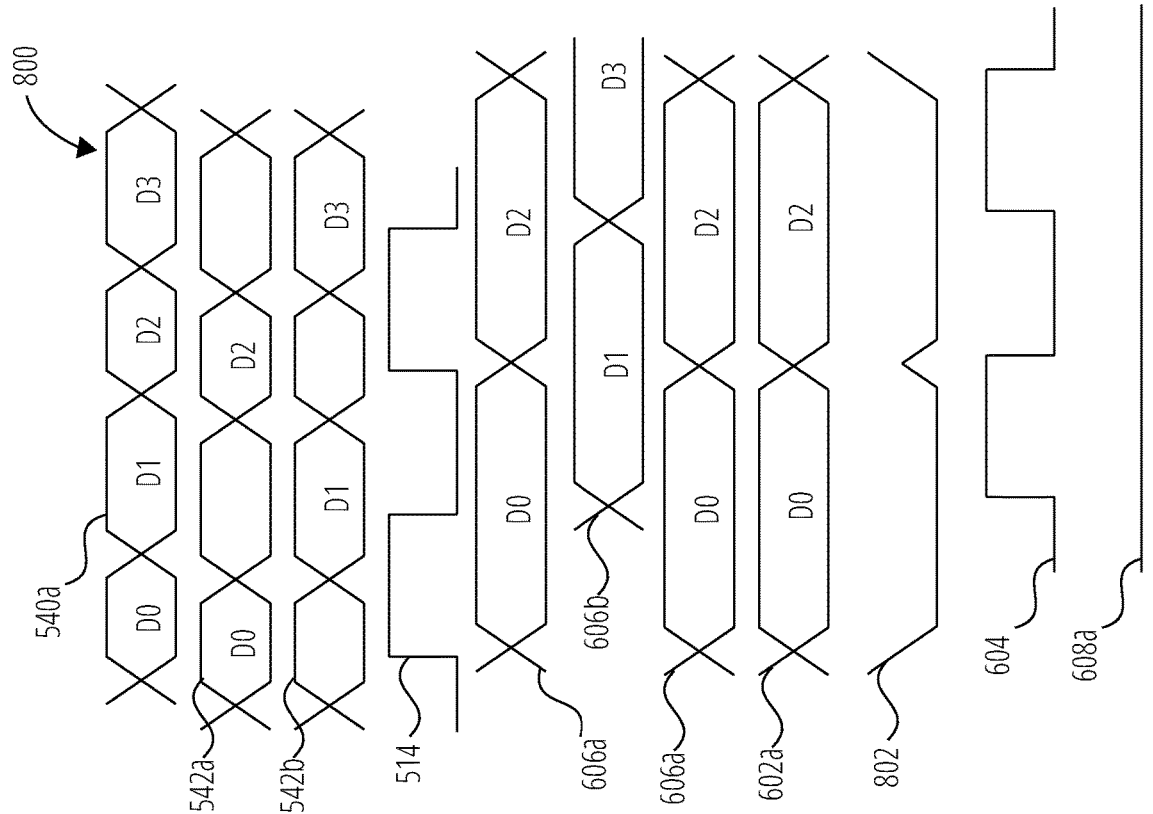
FIG. 8C is a signal timing diagram of the signals of the portion of FIG. 6 responsive to a midterm delay quantity provided from the control circuitry to the delay elements in the delay codes.

At operation 704 the method 700 includes sweeping delay codes 526 from a minimum delay quantity to a maximum delay quantity. FIG. 8B illustrates the signals 800 responsive to the minimum delay quantity, FIG. 8C illustrates the signals 800 responsive to a midterm delay quantity (e.g., halfway between the minimum delay quantity and the maximum delay quantity), and FIG. 8D illustrates the signals 800 responsive to the maximum delay quantity.

FIG. 8B is a signal timing diagram of the signals 800 of the portion 600 of FIG. 6 responsive to a minimum delay quantity provided from the control circuitry 508 to the delay elements 532a and 532b in the delay codes 610a and 610b.

Referring to FIG. 6, FIG. 7, and FIG. 8B together, since the delay codes 610a and 610b provided to the delay elements 532a and 532b indicate the minimum delay quantity (e.g., zero delay), the delayed data signals 542a and 542b may be delayed by the minimum quantity relative to the skewed data signal 540a.

Although the falling edges of the clock signal 514 may occur at points in time when the odd data bits D1 and D3 of the delayed data signal 542b are sufficiently settled to enable correct sampling of the odd data bits D1 and D3, the rising edges of the clock signal 514 may occur too close to the transitions between bits in the delayed data signal 542a to enable correct sampling of the even data bits D0 and D2. Accordingly, when the comparator 512a compares the latched even data bits 606a to the comparison signal 602a, the comparator 512a signals a failure to the control circuitry 508 using the comparison result 608a (e.g., by driving the comparison result 608a to logic level high voltage potentials for even bits D0 and D2).

FIG. 8C is a signal timing diagram of the signals 800 of the portion 600 of FIG. 6 responsive to a midterm delay quantity provided from the control circuitry 508 to the delay elements 532a and 532b in the delay codes 610a and 610b. Referring to FIG. 6, FIG. 7, and FIG. 8C together, as part of operation 704 (sweeping delay codes) the delayed data signals 542a and 542b are delayed relative to the skewed data signal 540a by less than the amount illustrated in FIG. 8A, but more than the amount illustrated in FIG. 8B. As a result, the rising edges of the clock signal 514 align in time with settled portions of the even bits D0 and D2 of the delayed data signal 542a, and the falling edges of the clock signal 514 align in time with settled portions of the odd bits D1 and D3 of the delayed data signal 542b. Accordingly, responsive to the clock signal 514, the latch 520a and the latch 520b correctly latch the even bits D0 and D2 and the odd bits D1 and D3 to the latched even data bits 606a and the latched odd data bits 606b, respectively, corresponding to logic level low voltage potentials in the pass/fail indication 802 (passes). Responsive to the delayed clock signal 604, the comparators 512a and 512b indicate to the control circuitry 508 using the comparison result 608a that the comparisons passed (e.g., by maintaining the comparison result 608a to logic level low voltage potentials to indicate that the even bits D0 and D2 passed the comparison). Although not shown in FIG. 8C, similar passes for the odd bits may be indicated using the comparison result 608b (FIG. 6).

FIG. 8D is a signal timing diagram of the signals 800 of the portion 600 of FIG. 6 responsive to a maximum delay quantity provided from the control circuitry 508 to the delay elements 532a and 532b in the delay codes 610a and 610b. Referring to FIG. 6, FIG. 7, and FIG. 8D together, as part of operation 704 (sweeping delay codes) the delayed data signals 542a and 542b are delayed relative to the skewed data signal 540a by a maximum delay quantity, which is more than the delay quantities illustrated in FIG. 8A, FIG. 8B, and FIG. 8C. With the delayed data signals 542a and 542b delayed by the maximum delay quantity the rising and falling edges of the clock signal 514 do not align with settled portions of the delayed data signals 542a and 542b. As a result both the latched even data bits 606a and the latched odd data bits 606b may include incorrect values, the pass/fail indication 802 indicates fails, and the comparison result 608a indicates a fail.

At operation 706 the method 700 includes setting the delay codes 526 (FIG. 5) to indicate delay quantities corresponding to a highest number of correct comparisons (e.g., between the latched even data bits 606a and the comparison signal 602a, and between the latched odd data bits 606b and the comparison signal 602b for the portion 600). As previously discussed, the midterm delay quantity, as discussed with respect to FIG. 8C, resulted in all correct bits being latched. In this example the delay codes 610a and 610b may be set to the mid-term delay quantity because the mid-term delay quantity resulted in the highest number of correct comparisons.

Of course the inclusion of an electrically controllable delay element (delay elements 532a-532f of FIG. 5) for each bit enables individual adjustments of delays for each of the delay elements 532a-532f, and operation 706, setting the delay codes 526, may result in different delay codes 526 provided to each of the delay elements 532a-532f. Even delay elements receiving the same skewed data signal (e.g., delay elements 532a and 532b, each of which receives the skewed data signal 540a) may be set, at operation 706, to different delay codes 526 (e.g., delay code 610a provided to delay element 532a may be different from delay code 610b provided to delay element 532b).

Figure 9:
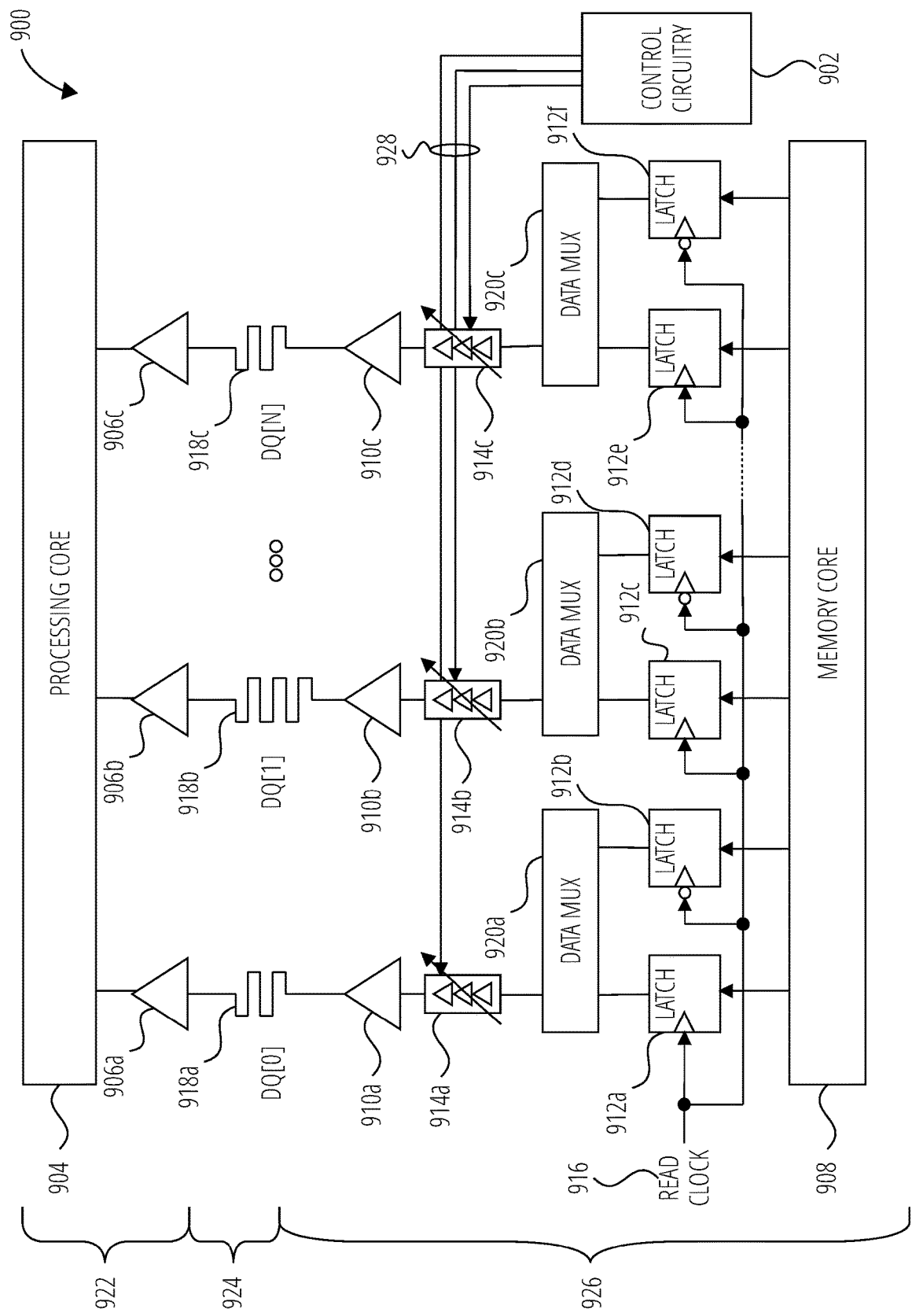
FIG. 9 is a block diagram of a computing system, according to some embodiments.

FIG. 9 is a block diagram of a computing system 900, according to some embodiments. The computing system 900 includes a computing host 922 (e.g., a central processing unit), a memory device 926 (e.g., a DRAM device), and a channel 924 electrically connecting the computing host 922 to the memory device 926. The channel includes transmission lines 918a-918c. In some embodiments the transmission lines 918a-918c may include conductive traces of a motherboard. The computing host 922 includes a processing core 904 electrically connected to the input buffers 906a-906c. Input terminals of the input buffers 906a are electrically connected to the transmission lines 918a-918c. The memory device 926 includes a memory core 908 (e.g., a DRAM core) electrically connected to latches 912a-912f, data multiplexers 920a-920c electrically connected to the latches 912a-912f, delay elements 914a-914c electrically connected to the data multiplexers 920a-920c, output buffers 910a-910c electrically connected between the delay elements 914a-914c and the transmission lines 918a-918c, and control circuitry 902 configured to provide delay codes 928 to the delay elements 914a-914c to control delays of the delay elements 914a-914c.

During a read operation in which the memory device 926 provides data read from the memory core 908 to the processing core 904 via the channel 924, the latches 912a-912f latch data stored by the memory core 908 responsive to a read data strobe signal (READ CLOCK 916). The data multiplexers 920a-920c multiplex the latched data and provide the multiplexed data to the delay elements 914a-914c. The 914a-914c delay the multiplexed data signals by delay quantities indicated by the delay codes 928 provided by the control circuitry 902 and the output buffers 910a-910c buffer the delayed data. The memory device 926 provides the buffered data to the transmission lines 918a-918c, which deliver the data to the computing host 922. The input buffers 906a-906c buffer the data received through the transmission lines 918a-918c and provide the buffered data to the processing core 904.

The control circuitry 902 may select the delay codes 928 to compensate for skew in the data delivered to the computing host 922. In some embodiments the control circuitry 902 may perform a calibration operation (e.g., the method 300 of FIG. 3) to determine how much to delay each delay element to reduce the skew. For example, the computing host 922 may include the pattern generation circuitry 102 and the output buffers 104a-104c of FIG. 1. The output buffers 104a-104c may be electrically connected in parallel with the input buffers 906a-906c between the processing core 904 and the transmission lines 918a-918c. As a result, read data, write data, and calibration data may all traverse substantially the same channel 924 between the computing host 922 and the memory device 926. Also, the memory device 926 may include the input buffers 106a-106c of FIG. 1 electrically connected to the transmission lines 160a-160c, and the 126a-126c, the sample circuitry 152, the clock delay element 128, the comparator circuitry 156, and the pattern generation circuitry 110. Moreover, the control circuitry 902 may be configured to perform the operations discussed above for the control circuitry 108.

Since the read data, write data, and calibration data may all traverse substantially the same channel 924 between the computing host 922 and the memory device 926, the same delay codes 146 provided to the delay elements 126a-126c of FIG. 1, which have been calibrated as discussed above, may also be provided to the delay elements 914a-914c as the delay codes 928 to reduce skew in the data provided to the processing core 904 during a read operation.

In some embodiments the delay codes 928 may be weighted to slightly skew the data provided to the processing core 904. The weights may be selected to be sufficiently small such that errors are not introduced in sampling the data by the processing core 904. A slight skew may, however, reduce cross talk as compared to cross talk that would be expected if the skew were perfectly cancelled out.

It is noted that although FIG. 9 illustrates skew reduction for read operations using DQ by DQ delay adjustments, a similar architecture to that of FIG. 5 may be implemented to provide bit by bit delay adjustments for read operations. By way of non-limiting example, the method 700 of FIG. 7 may be used to calibrate such a computing system to reduce skew on a bit by bit basis.

Figure 10:
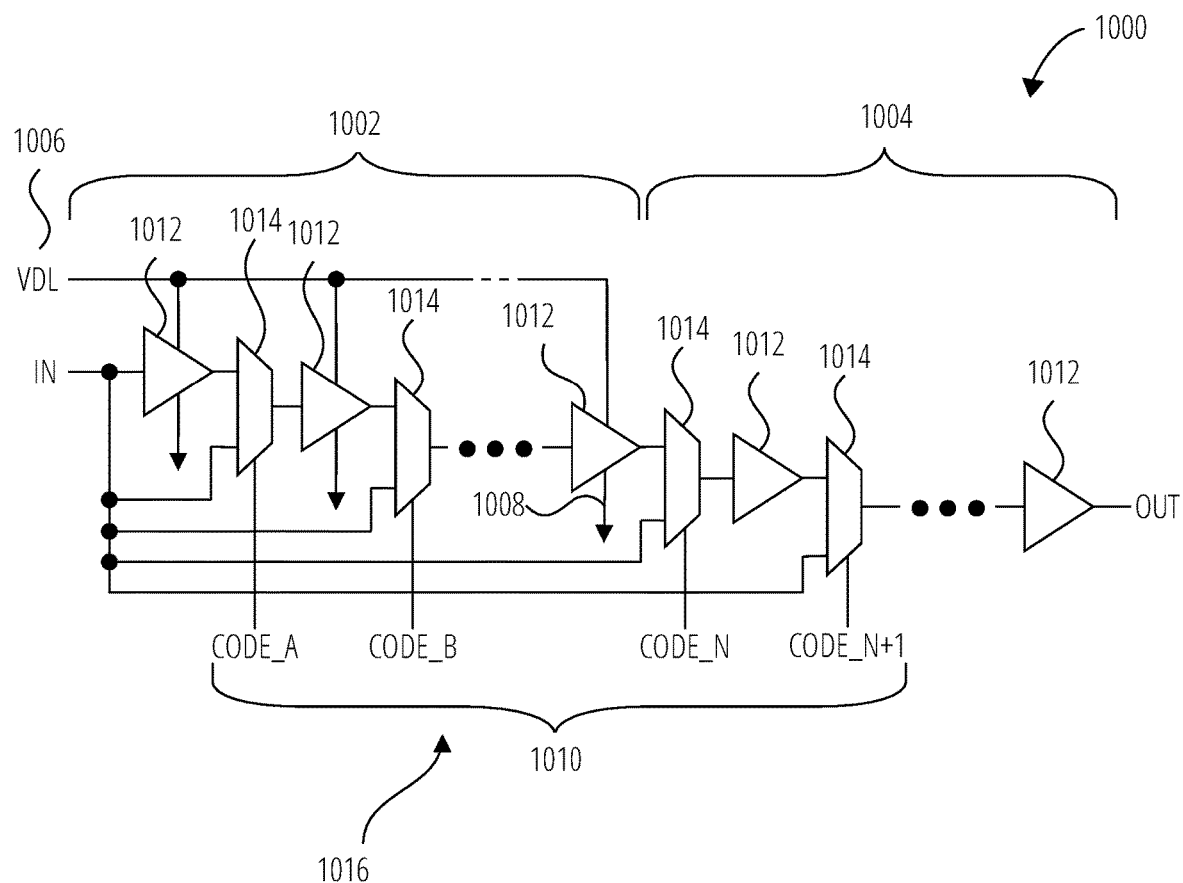
FIG. 10 is a circuit schematic illustration of an example of an electrically controllable delay element that may be used in the electrical system of FIG. 1, the electrical system of FIG. 5, and the computing system of FIG. 9.

FIG. 10 is a circuit schematic illustration of an example of an electrically controllable delay element 1000 that may be used in the electrical system 100 of FIG. 1, the electrical system 500 of FIG. 5, and the computing system 900 of FIG. 9. Specifically, the electrically controllable delay element 1000 may be used for the delay elements 126a-126c, the delay elements 532a-532f, and/or the delay elements 914a-914c. The electrically controllable delay element 1000 includes an alternating string of buffers 1012 and multiplexers 1014. In other words, the electrically controllable delay element 1000 includes of string of series-connected logic gates wherein every other one of the logic gates is a buffer 1012 and every other one of the gates is a multiplexer 1014. One of the inputs of each multiplexer 1014 may be electrically connected to an input terminal IN of the electrically controllable delay element 1000, and the other of the inputs of each multiplexer 1014 may be electrically connected to an output of the preceding buffer 1012. Accordingly, all of the preceding logic gates of the electrically controllable delay element 1000 preceding any given one of the multiplexers 1014 may be bypassed, reducing the total delay of the electrically controllable delay element 1000, by passing the input of the multiplexer 1014 that is electrically connected to the input terminal IN of the electrically controllable delay element 1000. An output terminal of each of the buffers 1012 preceding one of the multiplexers 1014 may be electrically connected to one of the input terminals of the proceeding one of the multiplexers 1014, and an input terminal of each of the buffers 1012 proceeding one of the multiplexers 1014 may be electrically connected to an output terminal of the preceding one of the multiplexers 1014.

The electrically controllable delay element 1000 also includes a delay adjustment terminal 1016 including channel select inputs of the multiplexers 1014. The delay adjustment terminal 1016 is configured to receive a delay code 1010 (e.g., from control circuitry such as the control circuitry 108 of FIG. 1, the control circuitry 508 of FIG. 5, and/or the control circuitry 902 of FIG. 9). The total delay of the electrically controllable delay element 1000 of a delayed data signal at an output terminal OUT of the electrically controllable delay element 1000 relative to a data signal at the input terminal IN of the electrically controllable delay element 1000 may be electrically controlled responsive to the delay code 1010.

Buffers 1012 in a fine delay portion 1002 of the electrically controllable delay element 1000 may be electrically connected between a controllable power supply high voltage potential node 1006 and a power supply low voltage potential node 1008. In the fine delay portion 1002, a power supply voltage potential VDL is controlled to enable small step size between different delays. Control circuitry (e.g., the control circuitry 108, the control circuitry 508, the control circuitry 902) may be configured to control the power supply voltage potential VDL. In a coarse delay portion 1004 of the electrically controllable delay element 1000 the buffers 1012 may be electrically connected to substantially non-variable power supply nodes (not shown). As a result, the delay due to coarse delay portion 1004 may be realized by the gates themselves with longer length of steps in delay adjustment as compared to that achievable in the fine delay portion 1002.

The electrically controllable delay element 1000 of FIG. 10 enables provision of accurate electrically controllable delay. An amount of chip area, or "real estate," occupied by the electrical system 100 may be relatively small as the logic gates of the electrically controllable delay element 1000 may be implemented using small complementary metal oxide semiconductor (CMOS) technology.

Figure 11:
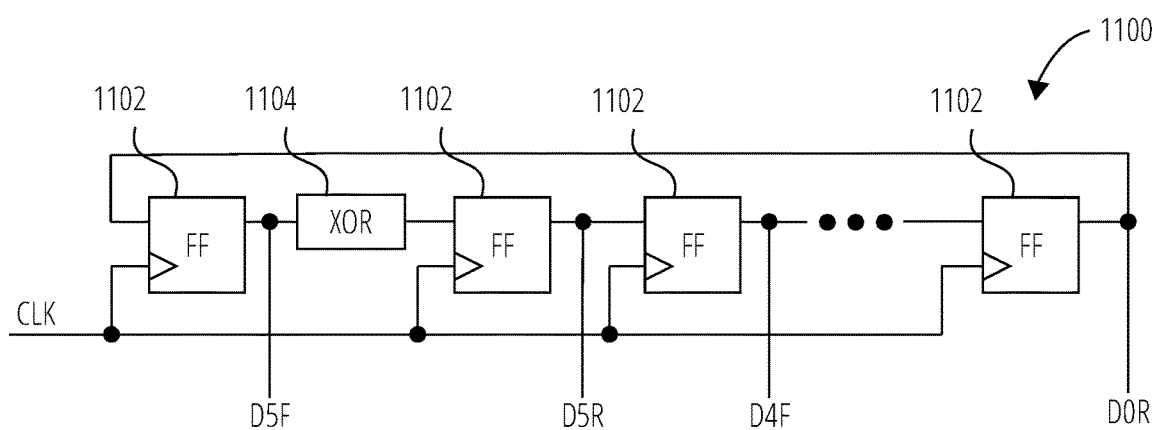
FIG. 11 is a circuit schematic illustration of an example of pattern generation circuitry that may be used in the electrical system of FIG. 1 and the electrical system of FIG. 5.

FIG. 11 is a circuit schematic illustration of an example of pattern generation circuitry 1100 that may be used in the electrical system 100 of FIG. 1 and the electrical system 500 of FIG. 5. Specifically, the pattern generation circuitry 1100 may be used for the pattern generation circuitry 102 and the pattern generation circuitry 110 of FIG. 1, and/or the pattern generation circuitry 502 and the pattern generation circuitry 510 of FIG. 5. Responsive to a clock signal CLK, The pattern generation circuitry 1100 is configured to provide pseudo random data bits D5F, D5R, D4F, . . . , D0R, which may be transmitted in the data signals 150a-150c and the comparison signals 154 (e.g., comparison signals 210a and 210b of FIG. 2) of FIG. 1 and in the data signals 536a-536c and the comparison signals 530 (e.g., the comparison signals 602a and 602b of FIG. 6) of FIG. 5.

The pattern generation circuitry 1100 includes a linear-feedback shift register (LFSR) chain, which includes a string of shift registers 1102 interspersed with one or more exclusive OR gates 1104. An output terminal of a last one of the shift registers 1102 is fed back as an input to a first one of the shift registers 1102. The outputs of each of the shift registers 1102 are configured to provide the data bits D5F, D5R, D4F, . . . , D0R.

The pattern generation circuitry 1100 may enable generation of pseudo random data and occupy only small chip area and operate based only on clock input (CLK). The pseudo random data generated by the pattern generation circuitry 1100 may be suitable for use as known values for data signals and comparison signals in calibration of delay and or duty in electrical systems (e.g., electrical system 100 of FIG. 1, electrical system 500 of FIG. 5, and computing system 900 of FIG. 9).

Figure 12:
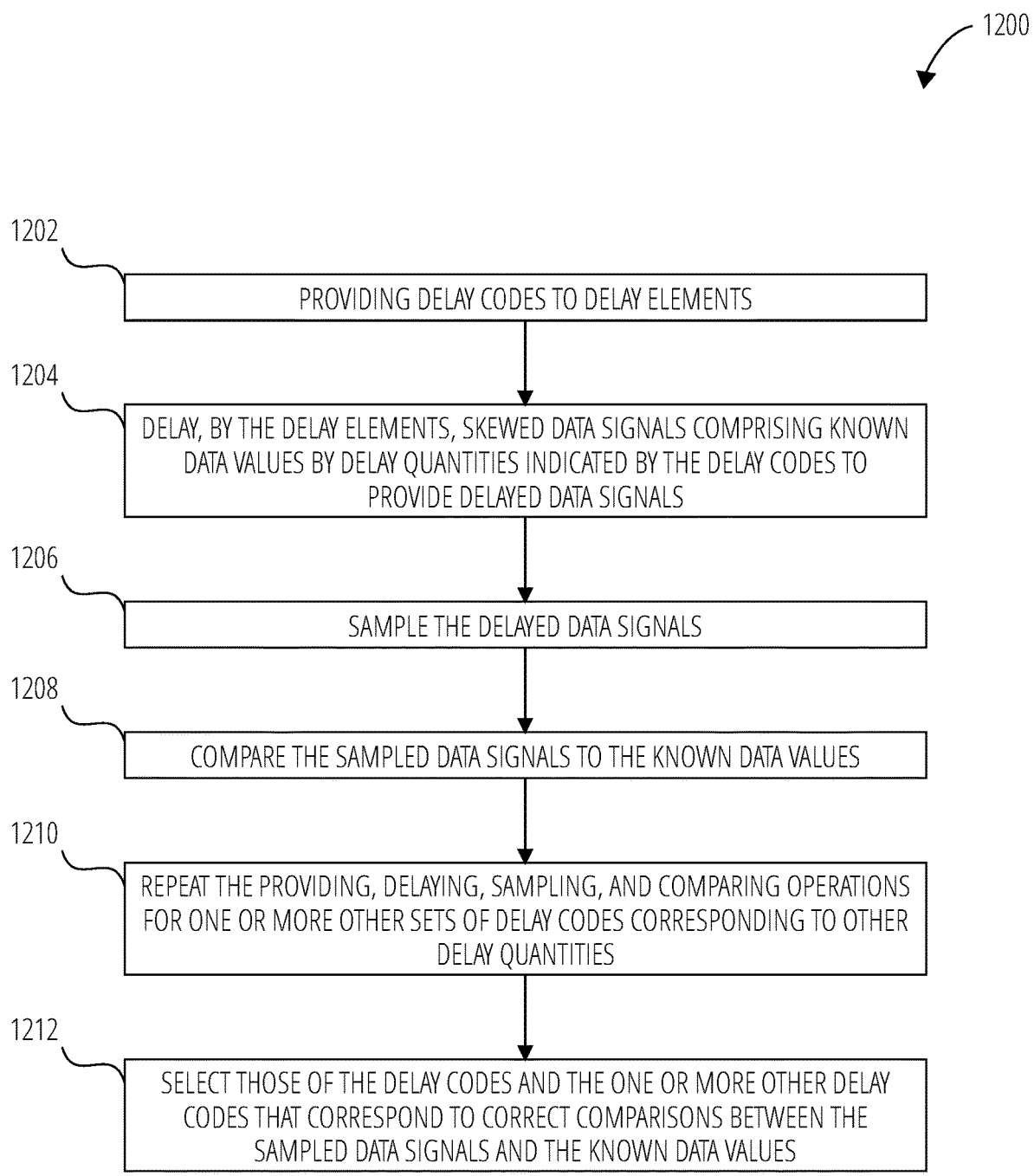
FIG. 12 is a flowchart illustrating a method of calibrating delay elements, according to some embodiments.

FIG. 12 is a flowchart illustrating a method 1200 of calibrating delay elements, according to some embodiments. At operation 1202 the method 1200 includes providing delay codes to delay elements. By way of non-limiting examples, the delay codes and delay elements may be the delay codes 146 and delay elements 126a-126c illustrated in FIG. 1, the delay codes 526 and the delay elements 532a-532f illustrated in FIG. 5, or the delay codes 928 and the delay elements 914a-914c of FIG. 9.

An example of inputs and outputs of the pattern generation circuitry 1100 is illustrated in Table 1 below:

TABLE 1

Inputs and Outputs of Pattern Generation Circuitry 1100

| CLK | D5F | D5R | D4F | D4R | D3F | D3R | D2F | D2R | D1F | D1R | D0F | D0R |
|---|---|---|---|---|---|---|---|---|---|---|---|---|
| 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 |
| 2 | 1 | 0 | 1 | 0 | 1 | 0 | 1 | 0 | 1 | 0 | 1 | 0 |
| 3 | 1 | 1 | 0 | 1 | 0 | 1 | 0 | 1 | 0 | 1 | 0 | 1 |
| 4 | 0 | 1 | 1 | 0 | 1 | 0 | 1 | 0 | 1 | 0 | 1 | 0 |
| 5 | 0 | 0 | 1 | 1 | 0 | 1 | 0 | 1 | 0 | 1 | 0 | 1 |
| 6 | 0 | 0 | 0 | 1 | 1 | 0 | 1 | 0 | 1 | 0 | 1 | 0 |
| 7 | 1 | 0 | 0 | 0 | 1 | 1 | 0 | 1 | 0 | 1 | 0 | 1 |
| 8 | 1 | 1 | 0 | 0 | 0 | 1 | 1 | 0 | 1 | 0 | 1 | 0 |
| 9 | 0 | 1 | 1 | 0 | 0 | 0 | 1 | 1 | 0 | 1 | 0 | 1 |
| 10 | 1 | 0 | 1 | 1 | 0 | 0 | 0 | 1 | 1 | 0 | 1 | 0 |

At delaying operation 1204 the method 1200 includes delaying, by the delay elements, skewed data signals comprising known data by delay quantities indicated by the delay codes to provide delayed data signals. At sampling operation 1206 the method 1200 includes sampling the delayed data signals, and at comparing operation 1208 the method 1200 includes comparing the sampled data signals to the known data. By way of non-limiting example, the known data may be generated using an LSFR pattern generator such as the pattern generation circuitry 1100 of FIG. 11.

At operation 1210 the method 1200 includes repeating the providing (operation 1202), delaying (operation 1204), sampling (operation 1206), and comparing (operation 1208) operations for one or more other sets of delay codes corresponding to other delay quantities. At operation 1212 the method 1200 includes selecting those of the delay codes and the one or more other delay codes that correspond to correct comparisons between the sampled data signals and the known data values.

Figure 13:
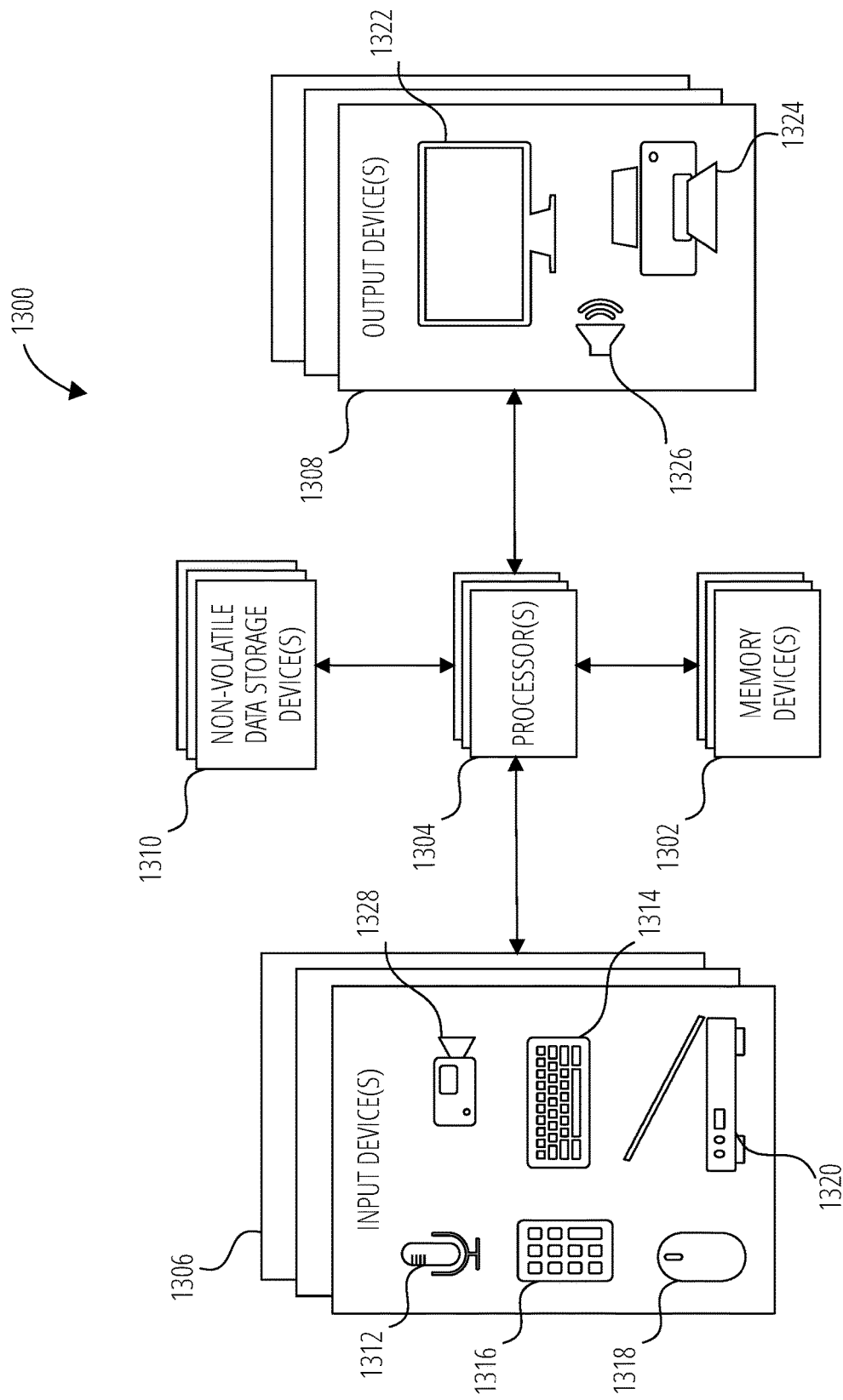
FIG. 13 is a block diagram of a computing system, according to some embodiments.

FIG. 13 is a block diagram of a computing system 1300, according to some embodiments. The computing system 1300 includes one or more processors 1304 operably coupled to one or more memory devices 1302, one or more non-volatile data storage devices 1310, one or more input devices 1306, and one or more output devices 1308. In some embodiments the computing system 1300 includes a personal computer (PC) such as a desktop computer, a laptop computer, a tablet computer, a mobile computer (e.g., a smartphone, a personal digital assistant (PDA), etc.), a network server, or other computer device.

In some embodiments the one or more processors 1304 may include a central processing unit (CPU) or other processor configured to control the computing system 1300. In some embodiments the one or more memory devices 1302 include random access memory (RAM), such as volatile data storage (e.g., dynamic RAM (DRAM) static RAM (SRAM), etc.). In some embodiments the one or more non-volatile data storage devices 1310 include a hard drive, a solid state drive, Flash memory, erasable programmable read only memory (EPROM), other non-volatile data storage devices, or any combination thereof. In some embodiments the one or more input devices 1306 include a keyboard 1314, a pointing device 1318 (e.g., a mouse, a track pad, etc.), a microphone 1312, a keypad 1316, a scanner 1320, a camera 1328, other input devices, or any combination thereof. In some embodiments the output devices 1308 include an electronic display 1322, a speaker 1326, a printer 1324, other output devices, or any combination thereof.

In some embodiments the computing system 1300 includes the electrical system 100 of FIG. 1, the electrical system 500 of FIG. 5, and/or the computing system 900 of FIG. 9. By way of non-limiting example, the processors 1304 may include the first device 130 of FIG. 1, the first device 518 of FIG. 5, and/or the computing host 922 of FIG. 5. Also by way of non-limiting example, the memory devices 1302 may include the second device 134 of FIG. 1, the second device 524 of FIG. 5, and/or the memory device 926 of FIG. 9. Accordingly, the memory devices 1302 may be configured to calibrate delays and/or duties of signals transmitted between the processors 1304 and the memory devices 1302 as discussed with respect to various embodiments disclosed herein.

Figure 14:
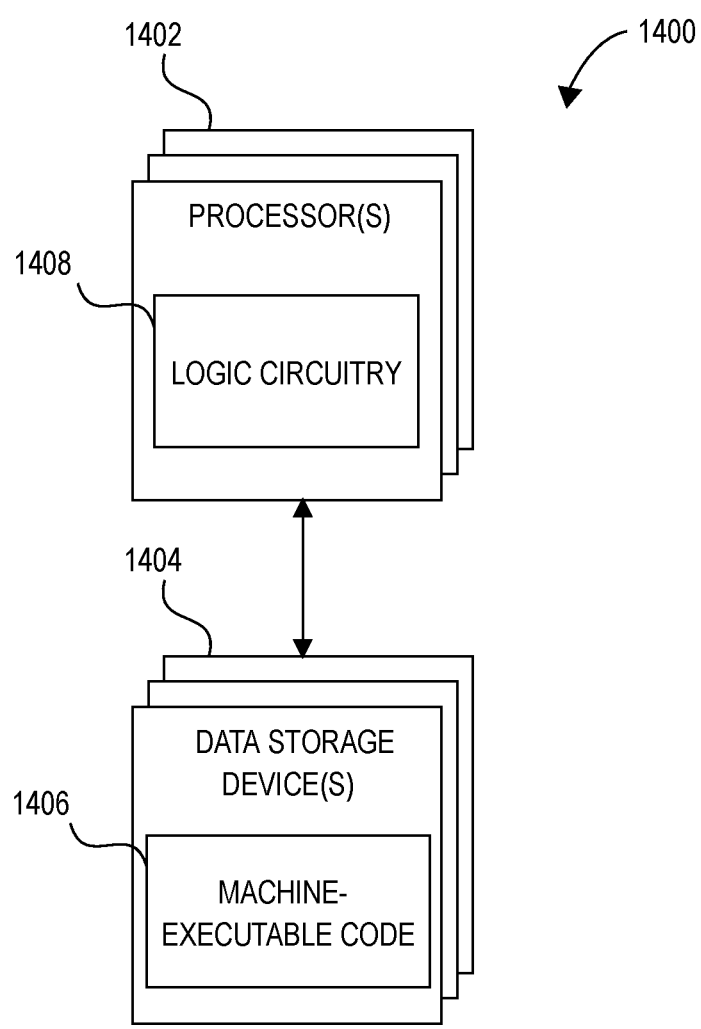
FIG. 14 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 14 illustrates non-limiting examples of implementations of functional elements disclosed herein. In some embodiments, some or all portions of the functional elements disclosed herein may be performed by hardware specially configured for carrying out the functional elements.

FIG. 14 is a block diagram of circuitry 1400 that, in some embodiments, may be used to implement various functions, operations, acts, processes, and/or methods disclosed herein. The circuitry 1400 includes one or more processors 1402 (sometimes referred to herein as "processors 1402") operably coupled to one or more data storage devices (sometimes referred to herein as "storage 1404"). The storage 1404 includes machine-executable code 1406 stored thereon and the processors 1402 include logic circuitry 1408. The machine-executable code 1406 includes information describing functional elements that may be implemented by (e.g., performed by) the logic circuitry 1408. The logic circuitry 1408 is adapted to implement (e.g., perform) the functional elements described by the machine-executable code 1406. The circuitry 1400, when executing the functional elements described by the machine-executable code 1406, should be considered as special purpose hardware configured for carrying out functional elements disclosed herein. In some embodiments the processors 1402 may be configured to perform the functional elements described by the machine-executable code 1406 sequentially, concurrently (e.g., on one or more different hardware platforms), or in one or more parallel process streams.

When implemented by logic circuitry 1408 of the processors 1402, the machine-executable code 1406 is configured to adapt the processors 1402 to perform operations of embodiments disclosed herein. For example, the machine-executable code 1406 may be configured to adapt the processors 1402 to perform at least a portion or a totality of the method 300 of FIG. 3, the method 700 of FIG. 7, and/or the method 1200 of FIG. 12. As another example, the machine-executable code 1406 may be configured to adapt the processors 1402 to perform at least a portion or a totality of the operations discussed for the control circuitry 108 of FIG. 1, the control circuitry 508 of FIG. 5, and/or the control circuitry 902 of FIG. 9. As a specific, non-limiting example, the machine-executable code 1406 may be configured to adapt the processors 1402 to sweep delay codes and/or duty codes to calibrate delay elements and/or duty adjustment elements (e.g., input buffers) as part of a calibration operation. As another specific, non-limiting example, the machine-executable code 1406 may be configured to adapt the processors 1402 to adjust delay and/or duty of data signals DQ in memory read and/or write operations.

The processors 1402 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 1406 (e.g., software code, firmware code, hardware descriptions) related to embodiments of the present disclosure. It is noted that a general-purpose processor (may also be referred to herein as a host processor or simply a host) may be a microprocessor, but in the alternative, the processors 1402 may include any conventional processor, controller, microcontroller, or state machine. The processors 1402 may also be implemented as a combination of computing devices, such as a combination of a DSP and a microprocessor, a plurality of microprocessors, one or more microprocessors in conjunction with a DSP core, or any other such configuration.

In some embodiments the storage 1404 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 1402 and the storage 1404 may be implemented into a single device (e.g., a semiconductor device product, a system on chip (SOC), etc.). In some embodiments the processors 1402 and the storage 1404 may be implemented into separate devices.

In some embodiments the machine-executable code 1406 may include computer-readable instructions (e.g., software code, firmware code). By way of non-limiting example, the computer-readable instructions may be stored by the storage 1404, accessed directly by the processors 1402, and executed by the processors 1402 using at least the logic circuitry 1408. Also by way of non-limiting example, the computer-readable instructions may be stored on the storage 1404, transferred to a memory device (not shown) for execution, and executed by the processors 1402 using at least the logic circuitry 1408. Accordingly, in some embodiments the logic circuitry 1408 includes electrically configurable logic circuitry 1408.

In some embodiments the machine-executable code 1406 may describe hardware (e.g., circuitry) to be implemented in the logic circuitry 1408 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1408 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 1406 may include an HDL, an RTL, a GL description, a mask level description, other hardware description, or any combination thereof.

In embodiments where the machine-executable code 1406 includes a hardware description (at any level of abstraction), a system (not shown, but including the storage 1404) may be configured to implement the hardware description described by the machine-executable code 1406. By way of non-limiting example, the processors 1402 may include a programmable logic device (e.g., an FPGA or a PLC) and the logic circuitry 1408 may be electrically controlled to implement circuitry corresponding to the hardware description into the logic circuitry 1408. Also by way of non-limiting example, the logic circuitry 1408 may include hard-wired logic manufactured by a manufacturing system (not shown, but including the storage 1404) according to the hardware description of the machine-executable code 1406.

Regardless of whether the machine-executable code 1406 includes computer-readable instructions or a hardware description, the logic circuitry 1408 is adapted to perform the functional elements described by the machine-executable code 1406 when implementing the functional elements of the machine-executable code 1406. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
   delay elements, at least one of the delay elements including a string of alternating buffers and multiplexers, the delay elements including:
   data input terminals configured to receive skewed data signals;
   delay adjustment terminals configured to receive delay codes indicating delay quantities; and
   data output terminals configured to provide delayed data signals responsive to the skewed data signals, the delayed data signals delayed by the delay elements relative to the skewed data signals by the delay quantities indicated by the delay codes; and
   control circuitry electrically connected to the delay adjustment terminals, the control circuitry configured to provide the delay codes to the delay adjustment terminals, the delay codes selected to reduce a timing skew of the delayed data signals relative to a timing skew of the skewed data signals.

2. The apparatus of claim 1, further comprising sample circuitry electrically connected to the data output terminals, the sample circuitry configured to sample the delayed data signals.

3. The apparatus of claim 2, wherein the sample circuitry includes latches configured to latch the delayed data signals responsive to a clock signal.

4. The apparatus of claim 2, further comprising comparator circuitry configured to compare the sampled delayed data signals to known data values for the skewed data signals responsive to different delay codes corresponding to different delay quantities to calibrate the different delay quantities.

5. The apparatus of claim 4, further comprising pattern generation circuitry configured to:
   generate the known data values; and
   provide the known data values to the comparator circuitry.

6. The apparatus of claim 5, wherein the pattern generation circuitry includes a string of shift registers interspersed with one or more exclusive OR gates.

7. The apparatus of claim 1, comprising a memory device including the delay elements.

8. An electrical system, comprising:
   a first device comprising first input/output terminals configured to provide data signals, the first device comprising a computing host;
   transmission lines electrically connected to the first input/output terminals of the first device, at least one of the transmission lines having a transmission delay associated therewith that is different from one or more other transmission delays associated with one or more other transmission lines of the transmission lines; and a second device comprising a memory device configured to operate as a random access memory device for the computing host, the second device comprising:
  second input/output terminals electrically connected to the transmission lines, the second input/output terminals configured to receive skewed data signals via the transmission lines, the skewed data signals having skewed timing relative to the data signals;
  delay elements electrically connected to the second input/output terminals, the delay elements configured to receive the skewed data signals and provide delayed data signals, delays associated with the delay elements electrically controllable responsive to delay codes provided to the delay elements;
  read delay elements electrically connected to the second input/output terminals, the read delay elements configured to provide delayed read data signals including data read from a memory core of the memory device; and
  control circuitry configured to provide the delay codes to the delay elements and read delay codes to the read delay elements, the delay codes selected to reduce skewed timing of the delayed data signals relative to the skewed timing of the skewed data signals, and the read delay codes selected to reduce skew of the read data provided to the computing host responsive to the delayed read data signals.

9. The electrical system of claim 8, wherein the control circuitry is configured to select the delay codes to reduce the skewed timing of the delayed data signals as compared to the skewed timing of the skewed data signals received by the delay elements.

10. The electrical system of claim 8, wherein at least one of the delay elements includes a string of alternating buffers and multiplexers.

11. The electrical system of claim 8, wherein the data signals comprise data signals for a memory write operation.

12. The electrical system of claim 8, wherein the control circuitry is configured to select the read delay codes to introduce sufficient skew in the delayed read data signals to reduce crosstalk between signals conducted by the transmission lines.

13. The electrical system of claim 8, wherein the second device includes input buffers electrically connected between the second input/output terminals and the delay el elements.

14. The electrical system of claim 13, wherein the control circuitry is configured to provide duty codes to the input buffers to adjust duties of the skewed data signals.

15. The electrical system of claim 8, wherein:
  the first device further includes pattern generation circuitry configured to generate a pattern for the data signals;
  the second device further includes:
    pattern generation circuitry configured to generate the pattern for comparison signals; and
    comparator circuitry configured to compare the delayed data signals to the comparison signals; and
  the control circuitry is configured to calibrate the delay codes responsive to comparisons performed by the comparator circuitry.

16. The electrical system of claim 15, wherein the control circuitry is configured to calibrate the delay codes by applying different delay codes to the delay elements and selecting delay codes that correspond to correct comparisons between the delayed data signals and the comparison signals.

17. A method of calibrating delay elements, the method comprising:
  providing delay codes to delay elements, at least one of the delay elements including a string of alternating buffers and multiplexers;
  delaying, by the delay elements, skewed data signals comprising known data values by delay quantities indicated by the delay codes to provide delayed data signals;
  sampling the delayed data signals;
  comparing the sampled delayed data signals to the known data values;
  repeating the providing, delaying, sampling, and comparing operations for one or more other sets of delay codes corresponding to other delay quantities; and
  selecting those of the delay codes and the one or more other sets of delay codes that correspond to correct comparisons between the sampled delayed data signals and the known data values.

18. The method of claim 17, further comprising delaying, by the delay elements, memory write data signals by selected delay quantities corresponding to the selected delay codes.

19. The method of claim 18, further comprising delaying, by read delay elements, memory read data signals by the selected delay quantities corresponding to the selected delay codes.

* * * * *

UNITED STATES PATENT AND TRADEMARK OFFICE
CERTIFICATE OF CORRECTION

PATENT NO. : 11,677,537 B2  
APPLICATION NO. : 17/204681  
DATED : June 13, 2023  
INVENTOR(S) : Hyunui Lee, Won Joo Yun and Baekkyu Choi Page 1 of 1

It is certified that error appears in the above-identified patent and that said Letters Patent is hereby corrected as shown below:

In the Claims

Claim 13, Column 27, Line 45, change "delay el elements." to --delay elements.--

Signed and Sealed this  
Eighth Day of August, 2023

Katherine Kelly Vidal  
*Director of the United States Patent and Trademark Office*